(12) United States Patent
Zlotkin

(10) Patent No.: US 10,794,027 B2
(45) Date of Patent: Oct. 6, 2020

(54) POLLUTION FILTER AND CONTAINMENT

(71) Applicant: Innermost Containment Systems L.L.C., San Juan Bautista, CA (US)

(72) Inventor: Michael Zlotkin, San Juan Bautista, CA (US)

(73) Assignee: Innermost Containment Systems L.L.C., San Juan Bautista, CA (US)

(*) Notice: Subject to any disclaimer, the term of this patent is extended or adjusted under 35 U.S.C. 154(b) by 148 days.

(21) Appl. No.: 16/054,928

(22) Filed: Aug. 3, 2018

(65) Prior Publication Data

US 2018/0340307 A1 Nov. 29, 2018

Related U.S. Application Data

(63) Continuation of application No. 14/823,490, filed on Aug. 11, 2015, now Pat. No. 10,077,537, which is a
(Continued)

(51) Int. Cl.
| | |
|---|---|
| *E02B 15/04* | (2006.01) |
| *C02F 1/40* | (2006.01) |
| *E02B 15/08* | (2006.01) |
| *E02B 15/10* | (2006.01) |
| *C02F 1/48* | (2006.01) |
| *B01D 35/05* | (2006.01) |

(Continued)

(52) U.S. Cl.
CPC ......... *E02B 15/0814* (2013.01); *B01D 15/08* (2013.01); *B01D 17/02* (2013.01); *B01D 35/05* (2013.01); *C02F 1/00* (2013.01); *C02F 1/001* (2013.01); *C02F 1/281* (2013.01); *C02F 1/283* (2013.01); *C02F 1/285* (2013.01); *C02F 1/40* (2013.01); *C02F 1/48* (2013.01); *E02B 15/04* (2013.01); *E02B 15/045* (2013.01); *E02B 15/0857* (2013.01); *E02B 15/0864* (2013.01); *E02B 15/10* (2013.01); *C02F 2101/32* (2013.01); *C02F 2103/008* (2013.01); *Y02W 10/37* (2015.05)

(58) Field of Classification Search
CPC ............ E02B 15/0814; E02B 15/0864; E02B 15/045; E02B 15/08; E02B 15/0857; E02B 15/10; E02B 15/04; C02F 1/40; C02F 1/001; C02F 1/00; C02F 1/281; C02F 1/283; C02F 2101/32; C02F 2103/008; C02F 1/285; C02F 1/48; C02F 1/481; C02F 1/488; Y02W 10/37; B01D 17/02; B01D 35/05; B01D 15/08; B01D 17/0202
USPC ................................ 210/242.1, 242.3, 242.4
See application file for complete search history.

(56) References Cited

U.S. PATENT DOCUMENTS

| | | | | |
|---|---|---|---|---|
| 1,991,187 | A | * | 2/1935 | Zahm ...................... B01D 25/19 210/228 |
| 2,893,561 | A | * | 7/1959 | Duzich .................. B01D 35/06 210/223 |

(Continued)

*Primary Examiner* — Matthew O Savage
(74) *Attorney, Agent, or Firm* — DLA Piper LLP (US)

(57) ABSTRACT

Embodiments disclosed here include a buoyant filtration system and method including a buoyant rim which may be used to encircle a pollution source and attached to a submersible wall and floor. Some embodiments include the detachable filtration systems on or near the buoyant rim. Some embodiments include a bag attached to the buoyant rim where the bag is water permeable but retains the pollution in the water.

16 Claims, 22 Drawing Sheets

Related U.S. Application Data continuation of application No. 14/507,599, filed on Oct. 6, 2014, now abandoned, which is a continuation of application No. 14/014,141, filed on Aug. 29, 2013, now Pat. No. 8,899,874, which is a continuation of application No. PCT/US2013/057163, filed on Aug. 28, 2013.

(60) Provisional application No. 61/748,073, filed on Jan. 1, 2013, provisional application No. 61/736,537, filed on Dec. 12, 2012, provisional application No. 61/713,515, filed on Oct. 13, 2012, provisional application No. 61/693,960, filed on Aug. 28, 2012.

(51) Int. Cl.
*C02F 1/28* (2006.01)
*B01D 17/02* (2006.01)
*B01D 15/08* (2006.01)
*C02F 1/00* (2006.01)
*C02F 101/32* (2006.01)
*C02F 103/00* (2006.01)

(56) References Cited

U.S. PATENT DOCUMENTS

| | | | | |
|---|---|---|---|---|
| 3,724,662 | A * | 4/1973 | Ortiz | E21B 43/0122 405/65 |
| 5,080,783 | A * | 1/1992 | Brown | E02B 15/045 210/170.05 |
| 7,179,377 | B1 * | 2/2007 | Caughman, Jr. | B01D 29/05 210/232 |
| 8,021,548 | B2 * | 9/2011 | Gross | B07B 1/4681 210/244 |
| 2006/0273002 | A1 * | 12/2006 | Maymudes | E03C 1/264 210/460 |

* cited by examiner

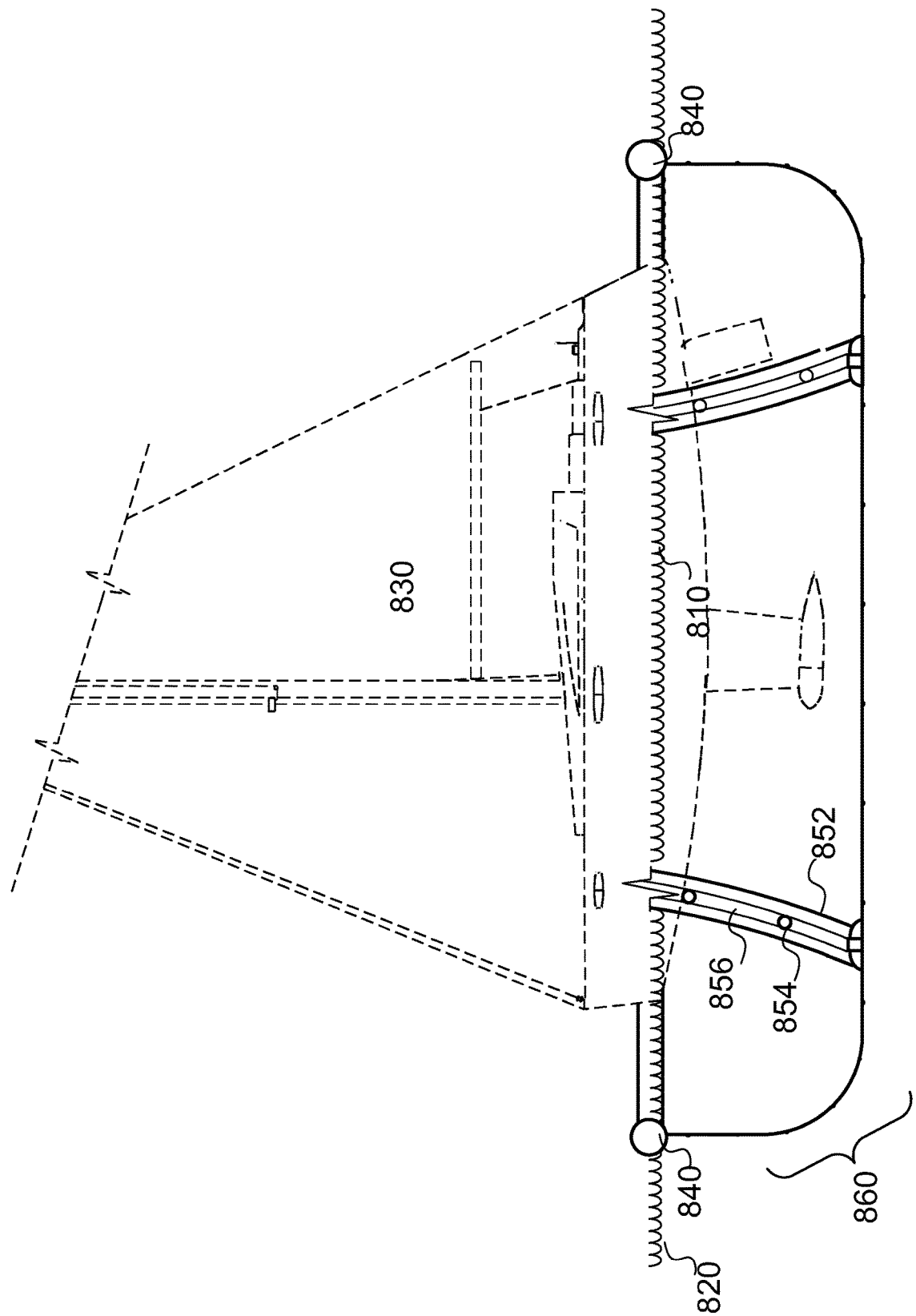

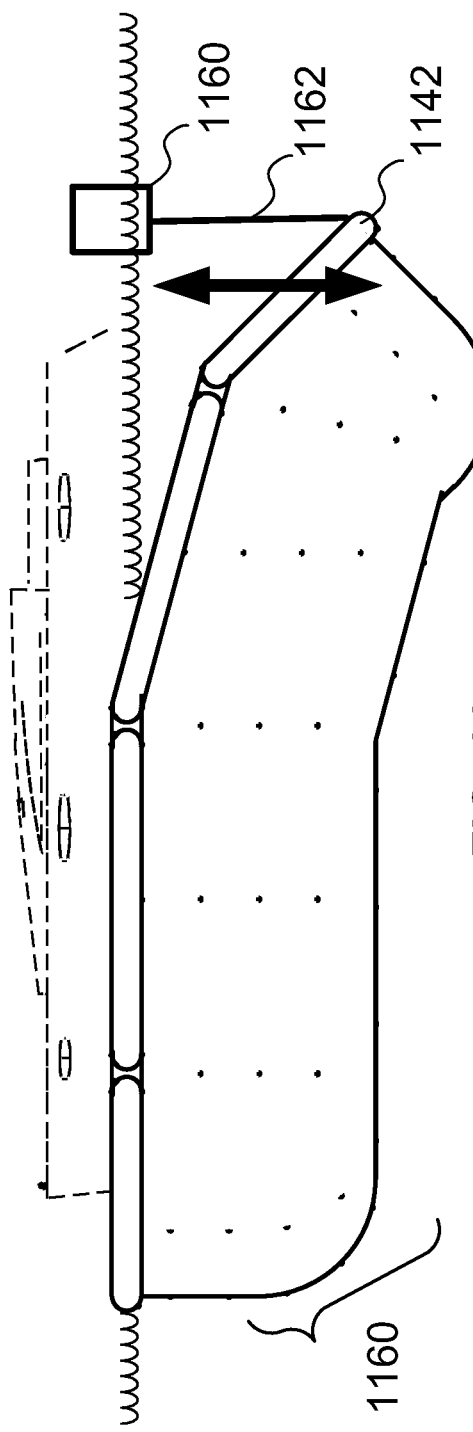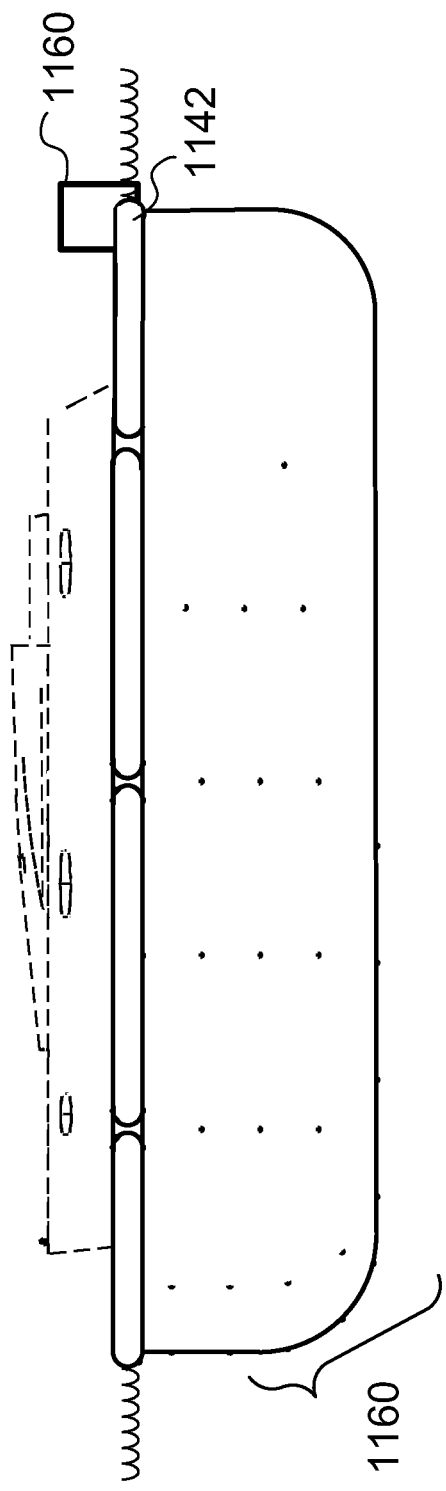
FIG. 11a
FIG. 11b

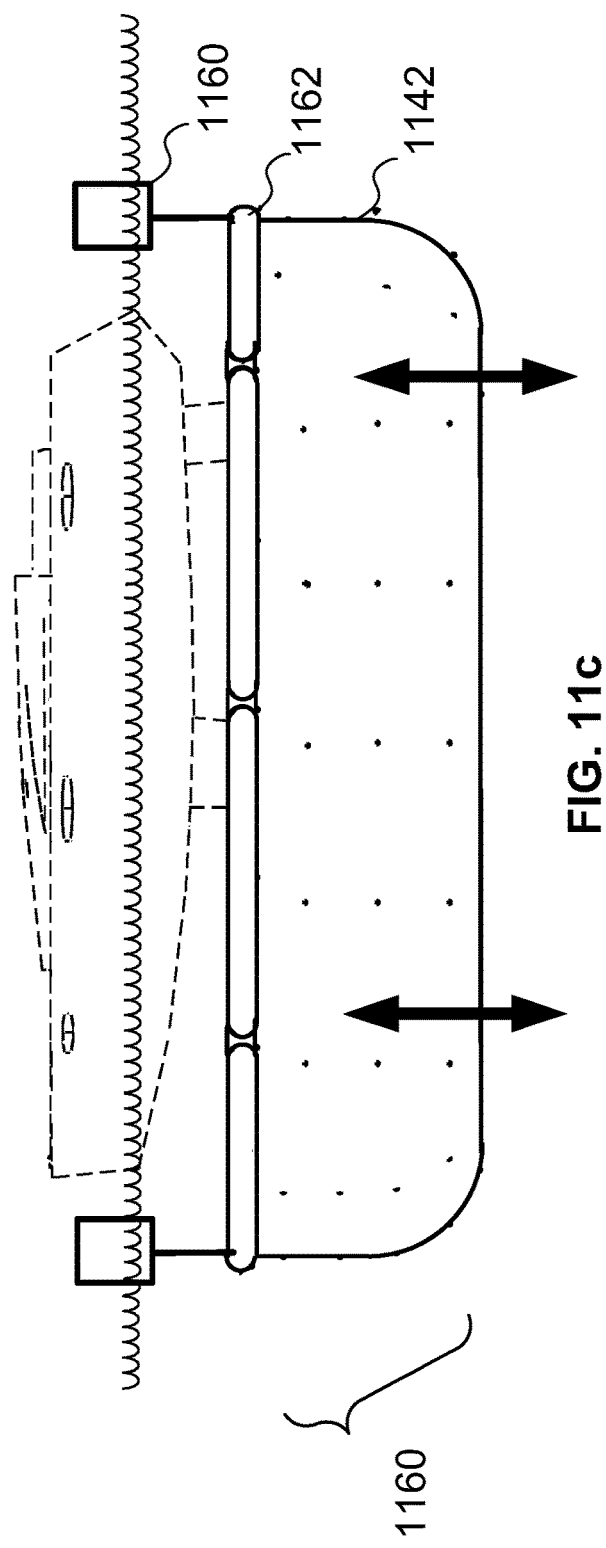
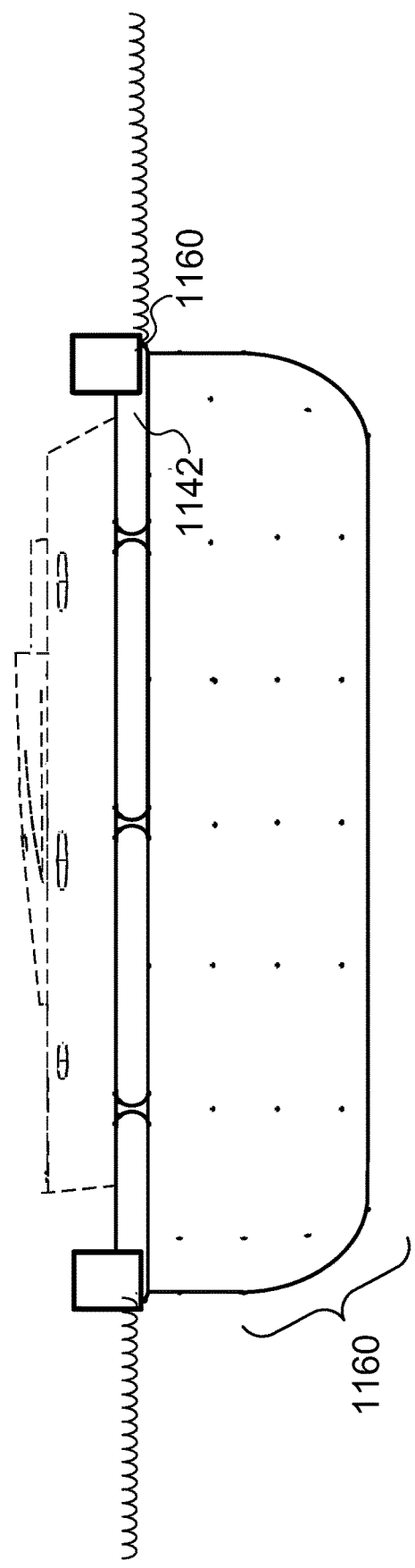

POLLUTION FILTER AND CONTAINMENT

CROSS REFERENCE TO RELATED APPLICATIONS

This patent application claims priority from and is a continuation of and claims priority to U.S. Ser. No. 14/823,490 filed 11 Aug. 2015 which is a continuation of and claims priority to U.S. Ser. No. 14/507,599 filed 6 Oct. 2014 which is a continuation of and claims priority to U.S. application Ser. No. 14/014,141 which was filed on 29 Aug. 2013 and which issued on 2 Dec. 2014 as U.S. Pat. No. 8,899,874, which claims priority from and is related to International application no. PCT/US13/57163 filed on 28 Aug. 2013, which claims priority from U.S. Provisional applications 61/693,960 filed 28 Aug. 2012; 61/713,515 filed 13 Oct. 2012; 61/736,537 filed 12 Dec. 2012 and 61/748,073 filed 1 Jan. 2013, which are all hereby incorporated by reference in their entireties.

TECHNICAL FIELD

This disclosure relates to containment and/or filtration in fluid environments.

BACKGROUND

Previous ways of containing and cleaning fluids included using fences or other floating booms on the surface of the fluid.

SUMMARY

Certain example embodiments herein include a containment system comprising, a segmented inflatable buoyant rim surrounding a void, wherein the rim segments each include at least one of an inflation/deflation valve and ballast weight and material connected to the rim segments, wherein the material is configured to hang below the buoyant rim void and enclose the void from below. Also, systems wherein the rim segments include a shield configured to project upwards, opposite of the hanging material. And systems wherein the enclosing material wall and segmented inflatable buoyant rim both includes at least one of a grommet, eye, hook, latch, and tie.

Certain example embodiments include systems wherein the material, having an inside toward the void and an outside, includes at least one vent, configured to allow material to move between the inside and the outside of the enclosing material. Still further systems include wherein the segmented inflatable buoyant rim includes at least one tethered buoy, configured to guide raising and lowering of at least one segment of the segmented inflatable buoyant rim. And wherein the rim is configured to allow attachment of at least two ribs, the ribs extending from opposite sides of the segmented inflatable buoyant rim and arching over the system, wherein the at least two ribs include material between them, forming an enclosure over the segmented inflatable buoyant rim and the inflatable buoyant rim void.

Example embodiments include systems wherein at least one buoyant rim segment is configured to attach to a ballast weight pulley, wherein the ballast weight is configured to weigh down and sink the at least one buoyant rim segment. And systems wherein the shield is configured to be at least one of, inflatable, a brush, a set of flexible fingers and a rigid wall. As well as systems wherein the enclosing material is composed of at least one of, flexible woven synthetic fibers, rigid woven synthetic fibers, flexible plastic, rigid plastic, flexible rubber, and rigid rubber. And certain embodiments include systems wherein the at least two ribs are configured to be inflatable and deflatable. As well as systems wherein the material between the ribs includes at least one vent, and wherein the enclosing material is made of a material that is impermeable to water.

Certain example systems include wherein the tether is at least one of an elastic, a rope, and a chain. And systems wherein at least two of the segments of the segmented inflatable buoyant rim are coupled by at least one hinge. As well as embodiments wherein the segmented inflatable buoyant rim inflation/deflation valves are configured to be operated remotely via at least one of, air pressure, electric, and hydraulic. Certain example embodiments include systems including enclosing material has an inside and an outside, the inside including at least one extraction tube anchored to it, the extraction tube configured to allow liquid from the inside of the enclosing material to be pumped out of the enclosing material. And example systems wherein the extraction tubes include at least one filtered vent to allow the liquid to pass but not solid material. Some example embodiments include wherein the enclosing material has an inside wall and an outside wall, including a void in between the inside and outside wall, wherein the inside wall of the enclosing material includes at least one extraction vent, configured to allow liquid inside the enclosing material to flow into the void. As well as examples wherein the extraction vents are configured to be opened and closed remotely. And further examples comprising a pump, removably connected to the rim and extraction tubes. Some example embodiments may include systems including a pump, removably connected to the rim and double walled enclosing material. And wherein the extraction tubes are made of flexible material. As well as examples wherein the extraction vents include at least one filter. Further included are examples wherein the shield is removably attached to the segmented buoyant rim segments, and wherein the ribs are removably attached to the segmented buoyant rim segments, and wherein the ribs and material form an enclosure around the top of the rim segments, including at least one access point, configured to be opened and closed.

Certain example embodiments include systems wherein the vents include a filter wherein the filter is at least one of a skimmer, mesh, micron, peat moss, straw, saw dust, feathers, carbon, clay, perlite, glass wool, vercumlite, plastic pad, plastic brush, plastic foam, polyurethane brush, polyurethane foam, polyurethane pad, polyethane brush, polyethane foam, polyethane pad, and polypropylene brush, polypropylene foam, and polypropylene pad.

Some example embodiments include a containment system comprising, a segmented buoyant rim, configured to allow attachment of at least one ballast weight, a submersible wall connected to the segmented rim, wherein the submersible wall is configured to hang below the buoyant rim, and a submersible floor connected to the wall. Further examples include systems wherein the buoyant rim is at least one of, both inflatable and deflatable, and inherently buoyant. Some example embodiments include systems wherein at least one buoyant rim segment is tethered to a buoyant float, wherein the buoyant float is configured to guide raising and lowering of the at least one buoyant rim segment. And wherein the wall and floor are made of water impermeable material. Certain example embodiments include systems wherein at least one buoyant rim segment is configured to attach a ballast weight pulley, the ballast weight pulley configured to allow a tethered weight to be raised and lowered, wherein the ballast weight is configured to weigh down and sink the at least one buoyant rim segment.

Certain example systems embodiments include wherein the buoyant rim and submersible floor and wall form a an inside and outside of the system, and wherein the floor includes at least one vent, configured to open and close, wherein the open vent is configured to allow liquid to flow between the inside and outside of the system, and the closed vent is configured to stop liquid from flowing between the inside and outside of the system.

Some example embodiments include systems wherein the vent includes a filter, also, systems wherein the wall includes at least two layers, the two layers separated by a void configured to allow liquid to pass. Certain example embodiments include systems wherein the wall is configured to connect to a pump, and the pump is configured to pump liquid out of the void. Certain example embodiments include systems further comprising at least one extraction tube, anchored to the floor, wherein the extraction tube includes at least one vent configured to allow liquid to be pumped out of the system. Also, wherein the vent includes a filter and some wherein the buoyant rim includes a filter.

Some example embodiments include a containment system comprising, a buoyant rim surrounding a void, and a tarp configured to drape over the buoyant rim and the void surrounded by the rim, wherein the tarp is configured to, attach to the buoyant rim, and contain particulate matter. Also, embodiments may include systems wherein the buoyant rim is inflatable. And, embodiments where the tarp is made of at least one of, a plastic sheet, woven synthetic mesh, and woven organic mesh. Example embodiments may also include systems wherein the tarp includes at least one vent, and/or wherein the at least one vent includes a filter, wherein the filter is at least one of a skimmer, mesh, micron, peat moss, straw, saw dust, feathers, carbon, clay, perlite, glass wool, vercumlite, plastic pad, plastic brush, plastic foam, polyurethane brush, polyurethane foam, polyurethane pad, polyethane brush, polyethane foam, polyethane pad, and polypropylene brush, polypropylene foam, and polypropylene pad. Example embodiments may also include systems wherein the buoyant rim includes at least one of a hollow plastic tube, a foam tube, a pipe, a wooden log, and a rubber tube.

Certain example embodiments include a buoyant filtration system comprising, a tubular buoyant rim attached to a submersible bag, the tubular buoyant rim having an outer surface, wherein the buoyant rim outer surface includes, a filter and at least one of a grommet, eye, hook, latch, and tie. Also, embodiments may include wherein the tubular buoyant rim is at least one of, solid core buoyant plastic, inflatable hollow plastic, inflatable hollow rubber, and solid core closed cell foam. Further, embodiments may include systems wherein the filter is at least one of a skimmer, mesh, micron, peat moss, straw, saw dust, feathers, carbon, clay, perlite, glass wool, vercumlite, plastic, polyurethane, polyethane, and polypropylene. Systems may also include wherein the submersible bag is at least one of, a rigid impermeable plastic, a flexible impermeable plastic bag, and a flexible impermeable rubber bag.

Example embodiments may also include systems wherein the tubular buoyant rim includes a spout and the filter is included in the spout, and wherein the attached submersible bag is configured to detach from the tubular buoyant rim.

Certain example embodiments include a buoyant filtration system comprising, a buoyant rim encircling a void and attached to a submersible bag, the buoyant rim having an outer surface, wherein the buoyant rim outer surface includes, a filter, and at least one of, a grommet, eye, hook, latch, and tie, and a pump configured to pump material out of the void. Further, embodiments may include systems wherein the buoyant rim is at least one of, solid core buoyant plastic, inflatable hollow plastic, inflatable hollow rubber, and solid core closed cell foam. Also, embodiments may include systems wherein the filter is at least one of a skimmer, mesh, micron, peat moss, straw, saw dust, feathers, carbon, clay, perlite, glass wool, vercumlite, plastic, polyurethane, polyethane, and polypropylene. And wherein the submersible bag is at least one of, a rigid impermeable plastic, a flexible impermeable plastic bag, and a flexible impermeable rubber bag. Some embodiments include systems wherein the pump includes an inlet tube and is configured to, attach to the buoyant rim, also, wherein the attached submersible bag is configured to detach from the tubular buoyant rim.

Some example embodiments include a method of containing pollutants comprising, surrounding a void with a segmented inflatable buoyant rim, wherein the rim segments each include at least one of an inflation/deflation valve and ballast weight, and attaching a bag to the rim segments, wherein the bag is configured to hang below the buoyant rim void.

Example embodiments may also include methods wherein the rim segments include a shield configured to project upwards, opposite of the hanging bag. Also methods wherein the bag wall and segmented inflatable buoyant rim both includes at least one of a grommet, eye, hook, latch, and tie. Some example embodiments include wherein the bag, having an inside toward the void and an outside, includes at least one vent, configured to allow material to move between the inside and the outside of the bag. And example methods wherein the segmented inflatable buoyant rim includes at least one tethered buoy, configured to guide raising and lowering of at least one segment of the segmented inflatable buoyant rim.

Example methods may also further comprise, attaching at least two ribs to the rim, the ribs extending from opposite sides of the segmented inflatable buoyant rim and arching over the system, wherein the at least two ribs include material between them, forming an enclosure over the segmented inflatable buoyant rim and the inflatable buoyant rim void. Also, methods further comprising, attaching at least one ballast weight pulley to at least one buoyant rim segment. Example methods may also include wherein the shield is configured to be at least one of, inflatable, a brush, a set of flexible fingers and a rigid wall, and methods wherein the bag is composed of at least one of, flexible woven synthetic fibers, rigid woven synthetic fibers, flexible plastic, rigid plastic, flexible rubber, and rigid rubber.

Some example embodiments may include methods wherein the at least two ribs are configured to be inflatable and deflatable. And methods wherein the material between the ribs includes at least one vent. Some embodiments may include methods wherein the bag is made of a material that is impermeable to water. And methods wherein the tether is at least one of an elastic, a rope, and a chain. Certain example embodiment methods may further comprise, coupling via at least one hinge, two segments of the segmented inflatable buoyant rim. Some example methods further comprise, remotely operating the segmented inflatable buoyant rim inflation/deflation valves. Also methods wherein bag has an inside and an outside, the inside including at least one extraction tube anchored to it, the extraction tube configured to allow liquid from the inside of the bag to be pumped out of the bag. Certain example embodiment methods include wherein the extraction tubes include at least one filtered vent to allow the liquid to pass but not solid material. And methods wherein the bag has an inside wall and an outside wall, including a void in between the inside and outside wall, wherein the inside wall of the bag includes at least one extraction vent, configured to allow liquid inside the bag to flow into the void. As well as methods further comprising, remotely opening and closing the extraction vents.

Some example methods further comprise, removably connecting a pump to the rim and extraction tubes. And methods further comprising, removably connecting a pump to the rim and double walled bag. Further, methods wherein the extraction tubes are made of flexible material. Some example embodiments include wherein the extraction vents include at least one filter. Also, methods further comprising, removably attaching the shield to the segmented buoyant rim segments. And further comprising, removably attaching the ribs to the segmented buoyant rim segments. As well as methods further comprising, enclosing an area above the rim segments, via the ribs and material, and opening and closing at least one access point in the material. Further, examples may include wherein the vent includes a filter and wherein the wherein the filter is at least one of a skimmer, mesh, micron, peat moss, straw, saw dust, feathers, carbon, clay, perlite, glass wool, vercumlite, plastic pad, plastic brush, plastic foam, polyurethane brush, polyurethane foam, polyurethane pad, polyethane brush, polyethane foam, polyethane pad, and polypropylene brush, polypropylene foam, and polypropylene pad. Also embodiment methods wherein the wherein the filter is at least one of a skimmer, mesh, micron, peat moss, straw, saw dust, feathers, carbon, clay, perlite, glass wool, vercumlite, plastic pad, plastic brush, plastic foam, polyurethane brush, polyurethane foam, polyurethane pad, polyethane brush, polyethane foam, polyethane pad, and polypropylene brush, polypropylene foam, and polypropylene pad.

Some example embodiments include a containment method comprising, attaching at least one ballast weight to a segmented buoyant rim, connecting a submersible wall to the segmented rim, wherein the submersible wall is configured to hang below the buoyant rim, and a submersible floor connected to the wall. Some example methods include wherein the buoyant rim is at least one of, both inflatable and deflatable, and inherently buoyant. Certain example embodiment methods further comprising, tethering at least one buoyant float to the at least one buoyant rim segment, raising and lowering the at least one buoyant rim segment, guiding the raising and lowering of the at least one rim segment with the buoyant float. Example methods may also include wherein the wall and floor are made of water impermeable material.

Example method embodiments may further comprise, attaching a ballast weight pulley to the at least one buoyant rim segment, tethering a weight to the ballast weight pulley, and raising and lowering the at least one buoyant rim segment via the ballast weight pulley. Also, examples may include methods further comprising, forming an enclosure with an inside and an outside via the buoyant rim and submersible floor and wall, wherein the floor includes at least one vent, configured to open and close, opening the at least one vent to allow liquid to flow between the inside and outside of the system, and closing the vent to stop liquid from flowing between the inside and outside of the system.

Certain example embodiments may include methods wherein the vent includes a filter. Also, methods wherein the wall includes at least two layers, the two layers separated by a void configured to allow liquid to pass. Some example embodiments include methods further comprising, pumping liquid out of the void via a pump connected to the rim. Some methods may further comprise, pumping material out of the system via at least one extraction tube anchored to the floor, wherein the extraction tube includes at least one vent. Some example embodiments include methods wherein the vent includes a filter and wherein the buoyant rim includes a filter.

Some example embodiments may include a method of containing a pollutant target comprising, surrounding a void via a buoyant rim and draping a tarp over the buoyant rim and the void surrounded by the rim, attaching the tarp to the buoyant rim, and containing particulate matter within the draped tarp. Example methods may include wherein the buoyant rim is inflatable and wherein the tarp is made of at least one of, a plastic sheet, woven synthetic mesh, and woven organic mesh. Certain examples may include wherein the tarp includes at least one vent and wherein the at least one vent includes a filter and wherein the wherein the filter is at least one of a skimmer, mesh, micron, peat moss, straw, saw dust, feathers, carbon, clay, perlite, glass wool, vercumlite, plastic pad, plastic brush, plastic foam, polyurethane brush, polyurethane foam, polyurethane pad, polyethane brush, polyethane foam, polyethane pad, and polypropylene brush, polypropylene foam, and polypropylene pad.

Examples may include methods wherein the buoyant rim includes at least one of a hollow plastic tube, a foam tube, a pipe, a wooden log, and a rubber tube. Examples may include methods of buoyant filtration comprising, attaching a tubular buoyant rim to a submersible bag, the tubular buoyant rim having an outer surface, wherein the buoyant rim outer surface includes, a filter, and at least one of a grommet, eye, hook, latch, and tie. Some examples may include methods wherein the tubular buoyant rim is at least one of, solid core buoyant plastic, inflatable hollow plastic, inflatable hollow rubber, and solid core closed cell foam. Certain example embodiments may include methods wherein the filter is at least one of a skimmer, mesh, micron, peat moss, straw, saw dust, feathers, carbon, clay, perlite, glass wool, vercumlite, plastic, polyurethane, polyethane, and polypropylene. Also, examples wherein the submersible bag is at least one of, a rigid impermeable plastic, a flexible impermeable plastic bag, and a flexible impermeable rubber bag. Certain methods examples may also include wherein the submersible bag is water permeable but oil impermeable. Also methods may further comprise, detaching and attaching the attached submersible bag from the tubular buoyant rim.

Some example embodiments may include a method of buoyant filtration comprising, encircling a void via a buoyant rim, attaching the buoyant rim to a submersible bag, the buoyant rim having an outer surface, wherein the buoyant rim outer surface includes, a filter, and at least one of, a grommet, eye, hook, latch, and tie, and pumping material out of the void via a pump.

Example methods may include wherein the buoyant rim is at least one of, solid core buoyant plastic, inflatable hollow plastic, inflatable hollow rubber, and solid core closed cell foam. Examples could include methods wherein the filter is at least one of a skimmer, mesh, micron, peat moss, straw, saw dust, feathers, carbon, clay, perlite, glass wool, vercumlite, plastic, polyurethane, polyethane, and polypropylene. Also, methods wherein the submersible bag is at least one of, a rigid impermeable plastic, a flexible impermeable plastic bag, and a flexible impermeable rubber bag. And methods wherein the pumping is via an inlet tube attached to the buoyant rim. Further, examples may include methods further comprising attaching and detaching the submersible bag from the tubular buoyant rim.

BRIEF DESCRIPTION OF THE DRAWINGS

For a better understanding of the technology described in this document as well as any embodiments thereof, reference should be made to the description below, in conjunction with the following figures in which like reference numerals refer to corresponding parts throughout the figures.

FIG. 8 is an example cut-away diagram showing a side view of the containment system consistent with certain embodiments herein.

FIG. 11a is an example diagram of the system with a tethered buoy consistent with certain embodiments herein.

FIG. 11b is another example diagram of the system with a tethered buoy consistent with certain embodiments herein.

FIG. 11c is an example diagram showing a tethered buoyed system consistent with certain embodiments herein.

FIG. 11d is another example diagram showing a tethered buoyed system consistent with certain embodiments herein.

DETAILED DESCRIPTION

Figure 1:
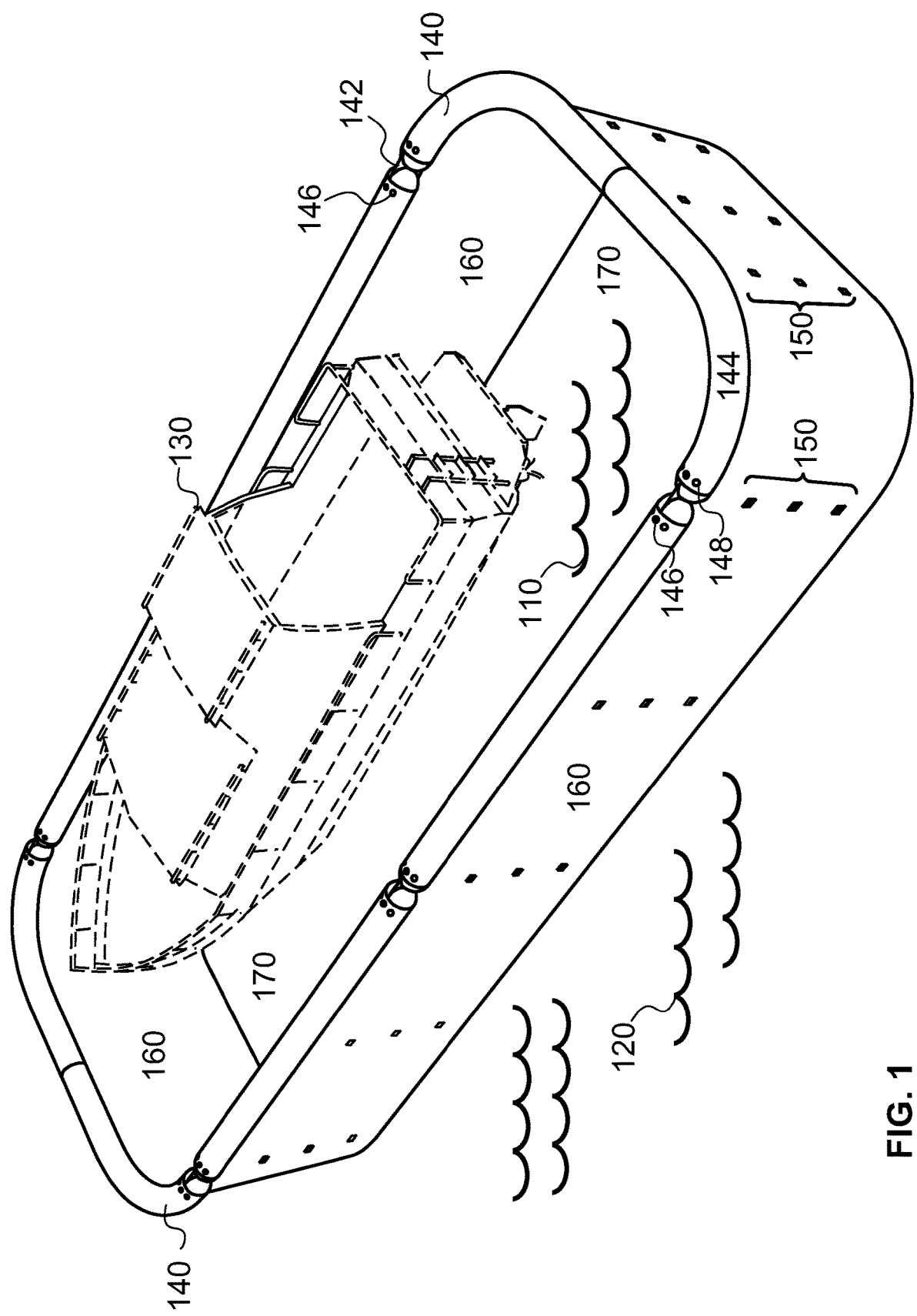
FIG. 1 is an example diagram of the containment systems consistent with certain embodiments herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Ships and vessels in a harbor are unfortunately not environmentally friendly. Many times, pollution such as fuel, oil, hydraulic fluid, and any number of potentially harmful items may be discarded from a vessel. Additionally, such vessels require maintenance that can produce pollution as well. Cleaners, paint, heavy metals, and loose parts can all contribute to polluting a harbor. Such pollution could leak in any three-dimensional direction, radiating from the source point, including down, floating on top, and carried away by wind or currents. Such repairs can also require a diver working in often harmful and dangerous conditions. Some aims of the certain embodiments of the systems and methods disclosed here, include containment of water around a target polluter, such as a floating vessel. This containment can include surface as well as subsurface disbursement of pollutants. After confinement, such pollutants can be filtered out and the water may be cleaned. In some instances, the cleaned water may be returned straight to the harbor water itself, or removed completely. The containment systems disclosed here may also be portable and can be moved and placed around offending vessels in and around a harbor, or moved to any other location where it is needed.

The containment systems and methods disclosed here can contain such leaks with a submersible containment system that uses a buoyant air-chambered floating rim coupled with a submerged containment walls and floor in certain embodiments. Such a system could be maneuvered into place using different methods, such as from directly below by completely deflating the rim, or from the side, by deflating portions of the rim and dropping those portions and sliding into place. Once contained, the system could be used to contain and segregate the target and then filter the contained contaminated water to prevent its spread. The system could be made in any number of shapes, sizes or dimensions in order to accommodate various sized and shaped targets of pollution sources near or above the water's surface.

Further, introducing water into the containment system can create space within the containment system for vessel cleaning, maintenance and/or repair work. In such an arrangement, divers would be able to work on contained vessels within the segregated water in the system, resulting in containment of any pollutants generated from work on vessel, both above and below the waterline surface.

Additionally, certain embodiments allow for monitoring of the output of the target inside the containment system. For example, any kind of monitor inside the system could keep a running tally of oil output. Further, monitors could be placed in the filtration systems or pumping systems or hoses in order to track or count particulates, pollution, chemicals, etc.

And certain embodiments herein may be used as buoyant filtration systems, where the target to be contained is any kind of pollutant source. Such sources could be filtered without surrounding a physical object such as a boat, but as a way to trap unwanted materials, and allowing other matter, such as water, to pass through.

It should be noted that the containment system could be used for any number of targets, such as ships, boats, watercraft of all sorts, as well as other kinds of pollution or discharge sources on land, affixed to land or the bed of the water body. In this disclosure, the use of the term "vessel" or target are not meant to be limiting and those of skill in the art would understand that they are meant to include all manner of things which the system could contain and segregate, no matter the shape size or makeup.

Additionally, the disclosure includes discussions of "water" as the fluid in which the target floats and receives the contamination. It is to be understood that any kind of fluid is contemplated, although open bodies of water are used as the example herein.

Further, use of the word pollutants could include any kind of matter, whether considered a pollutant or not. It is to be understood that in this description, a "pollutant" could be anything that is to be kept from the larger fluid body, and contained within the system.

Containment System

The containment systems disclosed here can be made up of two main components, according to certain embodiments: a buoyant rim component, and a submerged walls and floor material. The materials that make up these components could be any kind of material that segregates the undesired material from the outside of the containment system. For example, the containment system may be constructed of material that is impermeable to the intended target pollutant. This could be any number of materials as described below.

The shape of the containment system could be any shape, used to surround the target pollution source. This includes the buoyant rim sections that could be composed of one or more sections of air chambers which surround the vessel or pollution source intended to be contained. The buoyant rim sections could likewise be any number of shapes and sizes, depending on the shape of the target. The examples depicted in the figures typically show a rectangular shape, as viewed from the top of bottom, including rounded corners.

In certain examples of the disclosed inventions, the containment system uses an inflatable rim made buoyant by pumping air into the rim chambers through inflation valves. Air within these chambers creates buoyancy used to support the system. Thus, when inflated, the buoyancy of the air contained within the rim suspends the containment system walls and floor material beneath. Each air chamber can have one or more inflation valves for inflation of the rim and one or more air-release valves or purge valves for deflation of the rim. The valves could be manually operated or automatically operated through electronic, pneumatic or hydraulically actuated operation. This automatic operation could be through wired or wireless systems.

FIG. 1 is a three dimensional drawing showing an example of the containment system in use, containing a floating target in water. The target contained in the system here is shown an example vessel, 130. In this example, the contained water, 110 is segregated from the water outside of the system, 120, here, the open water of a lake or ocean, so the vessel can be maintained and any pollution contained within the system. The containment system could be made of a number of materials to keep the pollutant materials and segregated water separate and apart from the outside environment. Certain embodiments of the system could be made of materials that are collapsible and able to be folded, rolled, or compressed for transport and/or storage.

Embodiments with a Buoyant Rim

Looking now at the containment system's air-chambered rim 140, the example in FIG. 1 shows the individual chambers 144 connected with a section of wall material 142 in-between air chambers 144. The air chambers could be integrated inside of the housing of the rim 140, or could create actual segments, with discernible end of a chamber as well, as shown in FIG. 1. The number and arrangement of chambers can vary depending on the deployment of the system. The orientation of the chambers could likewise take a vertical, horizontal, nested, honeycomb, or any kind of shape.

Here, in this example, the air chambers 144 which make up the rim 140 are inflated through inflation valves 146 and deflated through purge or release valves 148. The example inflation 146 and deflation valves 148 are depicted at the ends of the respective rim sections 144. These valves could be placed on any number of sections of the rim in order to control the inflation and deflation of the sections. Further, the section could contain one or any number of these valves. Some example embodiments may use rim sections 144 with no valves at all, in instances where that section of the containment system is not designed to ever be submerged. In such instances, the rim section 144 could include foam or some other material that is not inflatable and deflateable.

The buoyant rim 140 could be made of any number of materials, such as a plastic or rubber material that is able to hold air inside and stay buoyant. This includes the buoyant rim 140 which may or may not have inherent buoyant tendencies of its own, separate and apart from the inflation capabilities. This depends on the material the rim may be made of. Such rim material could also be a closed cell or open celled foam material that does not need inflating, depending on the portion of the rim. The ability to deflate and inflate portions or all of the rim 140 is useful in the deployment of the system as disclosed below, but other alternative embodiments could include permanently buoyant materials as well, either alone or in combination.

For example, a rubber material may be included in the inflatable rim, which may be inherently buoyant even when not inflated. But such material may be bulky and in certain example embodiments, collapsibility may be important, so a material which is not inherently buoyant in and of itself but able to be inflated, may comprise the rim. In such case, the rim and the walls and floor of the system could be made of the same material. This material may be different thicknesses, or the same thickness, it may include different laminates or coatings, or the same.

The rim 140 segments 144 could include any number of partitions. In order to deploy the system, as described below, the rim 140 could be made of separate portions 144 or contain interior walls for segregation of chambers with the rim or within portions of the rim. In this way, as described below, different portions of the rim 140 could be deflated and inflated in order to sink or raise that portion of the system. If the rim is made of large portions, then the large sections are sunk or floated. If the rim is divided into more portions, the system could sink or float smaller portions of the rim.

In example arrangements where the rim 140 portions 144 are inflatable, such inflation could be with any number of gasses or fluids. One such example could use ambient air, which has a density less than the fluid that the target is floating in, pumped through an air pump, through an inflation valve 146 on the rim 140. Deflation could be through a release valve 148, also on the rim. Alternatively, the inflation and deflation/release valve could be the same valve, arranged to allow both inflation and deflation.

Another example could include inflation of the rim with another gas or fluid with a density less than the fluid which the target is floating in, and that gas or fluid is pumped back and forth inside of the chambers of the rim 140. In this way, in this example, no fluid or gas is ever completely expelled from the system, but rather routed to other portions of the rim 140 in order to complete the inflation and deflation, thereby floating and sinking those respective portions. Further, such an example could use outrigger bags or collapsible components that could expand and fill with gas or fluid as it is pumped out of one chamber and into another chamber.

The buoyant rim 140 can also act to hold the shape and form of the system both on the surface of the fluid and submerged in the fluid. Increasing the amount of water within the containment system could expand the rim of containment system to its size and shape and push the containment system walls and floor down and outward, by increasing the volume of fluid in the system, and thereby pressure on the walls and floor. On the surface, the buoyant rim can hold its shape around the floating target. In FIG. 1, the example rim 140 holds a rectangular shape with rounded corners. This shape could be any number of shapes depending on the shape and dimensions of the target to be surrounded, and the environment in which to deploy the system. Round shapes, triangular shapes, square shapes, oval shapes, could all be used, along with any number of others. The system could also include detachable and re-attachable sections 144 to customize the shape when needed.

Embodiments with a System Cover

Additionally, certain embodiments could include variants where the rim includes structures that support an overarching cover for the system (not pictured). For example, rigid ribs could arch over the system, from side to side, to cover and protect the interior of the system, and be of any height to accommodate a target within the system as well as people and/or equipment to work in, on, or around the target. One or both ends of the cover could be enclosed, making a garage type structure for the target. Other embodiments contemplate an inflatable cover that could draw its rigidity from inflatable ribs or the entire cover could be inflatable. The cover could also include an accordion-like foldable structure that could be stretched to cover the target, and removably fixed to the rim in a number of ways.

The embodiments that contemplate rigid ribs could be secured to opposing sides of the system at the rim, and could support a number of materials to be used to block sun, precipitation, or shield the system from winds. Such a cover could allow for people to maintain or work on the target vessel under better environmental conditions.

The cover could be completely enclosed instead of being open at one end or another. Such an example embodiment could create a completely enclosed top, over the buoyant rim structure, to entrap any material inside of the enclosed cover. Such a system could serve as a hazardous material containment system for example, as a paint booth or a sanding station, allowing for work inside of the cover, and particulate matter to be enclosed from below the target in the water as well as above the target in the air. Any number of vents could be included in the top cover as well, which could be used to keep contaminants contained. These may be used to keep particulate matter inside of the enclosed cover as well as to pump fresh uncontaminated air into the enclosed system.

The rim 140 could also include a ballast in order to aid in sinking portions of the containment system during deployment. Such a ballast could be offset by the inflation of the rim, so that when inflated, the rim floated, but when deflated, that portion of the rim would sink. The ballast could be modified or tailored to the fluid in which it was to be deployed, including salinity and fluid density considerations.

Embodiments with a Submerged Walls and Floor

Working together, the inflated rim 140, containment system walls 160 and floor 170 separate contained water 110 from the surrounding outside water 120 on both the surface, and subsurface. Alternatively, (not pictured) the containment system walls 160 and floor 170 could be integrated into one unit, without discernible and separate floors and walls, but rather a hemispherical shape, or other inverted dome-like shape or any other kind of integrated shape. Any type of rounded shape could be used in such a system, to accommodate the target inside the system, or to accommodate the surrounding environments.

The containment system material spanning beneath the rim 140, making up the walls 160 and floors 170, could be used to surround the vessel or pollution source beneath the surface of the fluid and is suspended by the rim's 140 buoyancy. The material for this underlying span including the walls 160, and floor 170, if applicable, could be made of any number of materials, depending on the deployment of the system. If the system is to be deployed to segregate some kind of pollutant from the outside material, then the material used in the walls 160 and floor 170 of the system should be able to withstand, to some degree, the movement of such material. That is, for example, if the containment system is being deployed to contain oil leaking from a vessel, then the material used in the system should be able to keep the oil from soaking through the material and ending up outside of the system. If the system is being deployed to contain large particulate material, such as paint chips being cleaned from the vessel, then the material should be such that it does not allow such paint chips from floating or falling through to the outside environment. Thus, the material could be any number of materials, depending on the deployment of the system.

Some examples of material that the system walls and floor could be made of include, laminated woven fabrics made of high tensile materials, KEVLAR, polymers, plastics, carbon, cotton or other material. In certain embodiments, the materials could be coated in order to reduce rot, to withstand different salinities, to resist algae and barnacle growth, to hold its shape in a current, or flow with the fluid to avoid tearing and ripping. In certain embodiments, the material could be laminated material, with different laminates made of different materials. In certain embodiments, the material could contain multiple layers to protect against different things, or to allow some materials to pass through, and others to remain contained. For example, the material may be water permeable, but still retain oil. In certain embodiments, the material could be woven and impregnated with plastics or resins in order to protect against certain things or allow for the movement of certain size of materials, but not others. In certain embodiments, the material could be stiff and resist deflection caused by outside forces. In other embodiments, the material could be soft and flexible.

The walls and/or floor of the system could include any number of vents (not pictured). In this way, the vents could open to the outside environment and allow the entire system to be picked up, the water to drain out of the bottom or sides, and not have to tip the entire system in order to let the water escape. Certain example vents could be used when picking up the system, out of the water, or when moving the system from place to place. For example, a boat crane could be used to secure under the system and lift it out of the water for maintenance, cleaning, moving, or any number of things. Such vents would allow for easier removal of water, when the boat crane secures the system from underneath, and picks it up, allowing for drainage of the system, and removal of the water or fluid weight.

Looking now at the containment system further, any number of anchor points 150 could be found through the containment system. These anchor points 150 could be located on the rim, on the walls, on the floor, or any and all combinations of these. The anchor points 150 could be any kind of eye, loop, cleat, tie down, hook, latch, or any other kind of apparatus. These anchor points could be used to attach ballast or weight to certain portions of the containment system. This ballast could help the system sink portions of the rim, as disclosed later, could be used to tether sections to outside elements such as a dock, a buoy, another system or any other kind of device. Such anchor points 140 could also be in the form of a handle or step. Such a formation could help divers navigate the system. Such anchor points 140 could also be located inside or outside of the system (not pictured).

Figure 2:
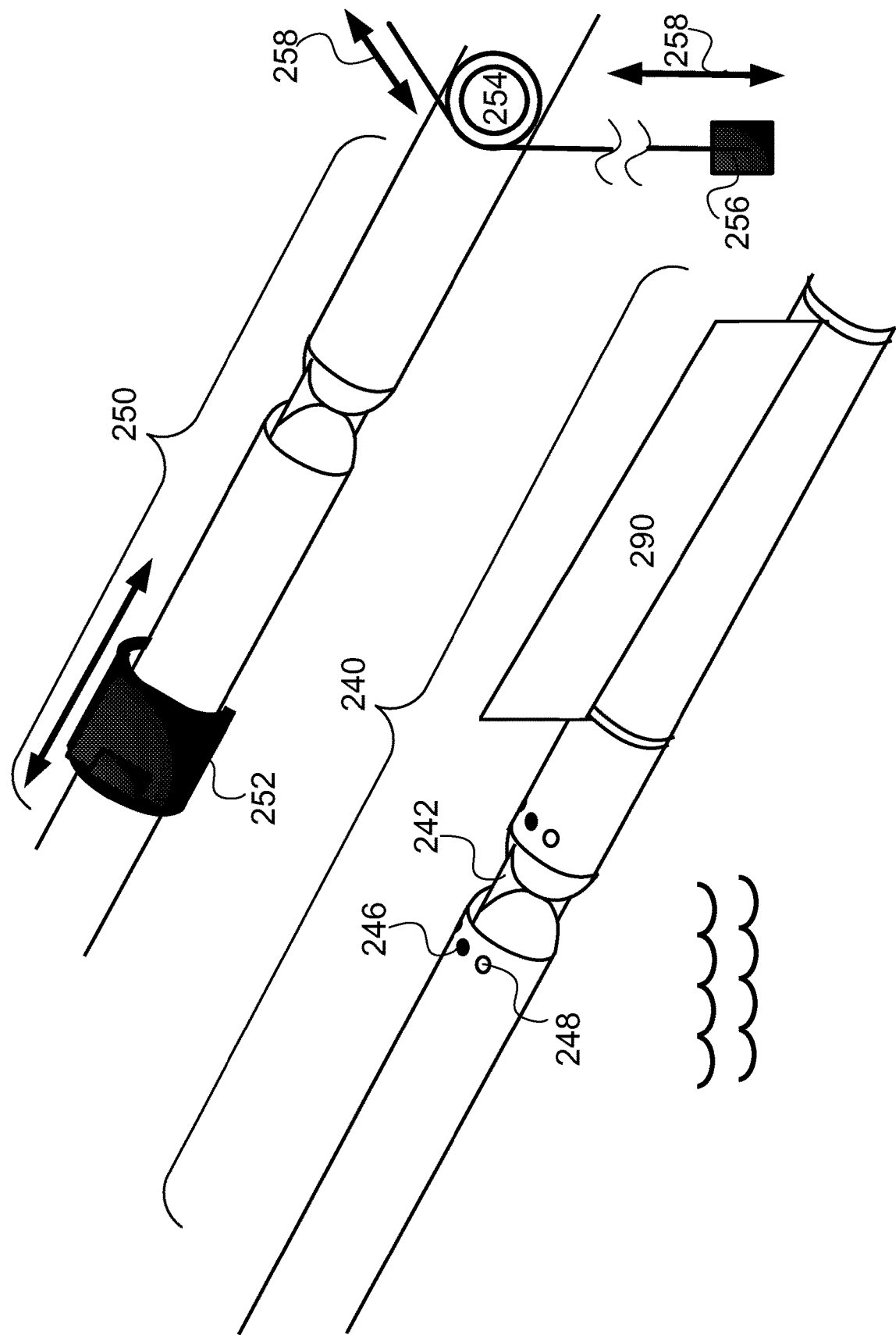
FIG. 2 is an example diagram showing example views of the rim of the system consistent with certain embodiments herein.

FIG. 2 shows a detail of an example inflatable rim 240 portion. The rim 240 may also include a shield, guard, or wall to protect from waves, splashes, wind or anything else. Such a shield could be a vertically arranged plastic wall or a series of plastic fingers that could block incoming or outgoing waves. The height of such a shield could vary from a few inches to a number of feet, depending on the deployment and the pollution to be contained. Further, such a shield could be removed or added to only certain portions of the rim as needed. For instance, if waves are coming only from the starboard side of the system, in reference to the contained vessel, for example, a shield system could be attached to that side of the system, to shield the waves from breaking or spilling into the containment system. As modular units, the shields could include different materials, different structures, or shapes.

Further, the shield itself could be inflatable. This would allow for the inflation of the shield when needed, and removal when not needed. This inflatable shield could be connected to or part of the buoyant rim 240. In this way, the shield could be put up or taken down without having to manually install anything, or add any parts. It could just be inflated when needed and deflated when not needed. The inflatable splash guards or shield could be any number of shapes including, but not limited to a narrow wall or a round portion, resembling the buoyant rim itself.

Also shown in the example of FIG. 2 are a detail of the inflation valves 248 and deflation valves 248. Also shown is a portion of the wall material 242 in between two segments of the rim 240. Also depicted is an example modular shield 290 which extends up above the waterline and can be moved to any portion of the rim 240.

The portion or portions of the rim which include the segments between rim segments, such as portion 242 could be made of and include any number of things. Some examples include a rigid brace that holds the rim portions together. Other examples include a hinge or hinges that allow for movement between rim portions.

Air can be released form the rim 240 air chambers through deflation valves 248. These deflation valves can be operated manually or automatically. They could be servo electric motors or pneumatically operated. The valves could be operated in any way, in order to open and shut and deflate when requested.

Embodiments with a Non-Inflatable Buoyant Rim

Also shown in FIG. 2 is a non-inflatable rim portion embodiment, 250. As the embodiments disclosed herein include arrangements of both inflatable/deflatable rims, and those that are buoyant but are not inflatable/deflatable. Such rim or rim segments, even though not inflatable, may still be lowered, in order to move targets in and out of containment. Such embodiments may use rim or rim segments that may require weighting in order to sink the rim or sections/segments that are buoyant.

Such non-inflatable embodiments would therefore not need an inflation/deflation valve(s). Further, embodiments may mix and match segments of rim with inflatable portions and non-inflatable portions, depending on the application.

As an example of a non-inflatable embodiment, a rim or rim segment could be made of closed cell foam. Such a rim or rim segment may need to be sunk via an attachable weight, or a sliding weight, that would counteract the inherent buoyancy of the rim or rim segment. Such an example weight 252 is shown in FIG. 2, which could be slid to certain portions of the rim to increase the weight on that section, and may, if coupled with other weights, be enough to sink that portion of the rim. Other various weights could be clipped, clamped, tied to or affixed in any way to a rim or rim segment to sink that portion or the entire rim. These could be attached with or without some kind of ring, eye, hook and loop, tie, etc. These weights could also be used in inflatable/deflatable embodiments, bur are included here as exemplar only.

Other example embodiments may include weights that could include pulley 254 weight 256 assemblies. Such example embodiments could include a pulley 254 or simply a ring or eyelet that a weight tether is tied to. When the weight 256 is fully extended on the tether, it may rest on the bottom or a sunken platform, etc. and not exert force on the rim or system. But when the tether is shortened, or pulled, as shown by the arrows 258 in FIG. 2, the weight may lift off the bottom, or platform and exert its weight force on the rim or rim segment. In such a way, that portion of the rim, or the entire rim could be sunk.

Other examples of non-inflatable rim or rim segments could include any kind of metal pipe, open celled foam, solid plastic, hollow plastic without inflation/deflation valves, or even logs of wood. Metal could include steel, iron, copper, brass, aluminum, or any other kind of metal.

Target Containment

Figure 3:
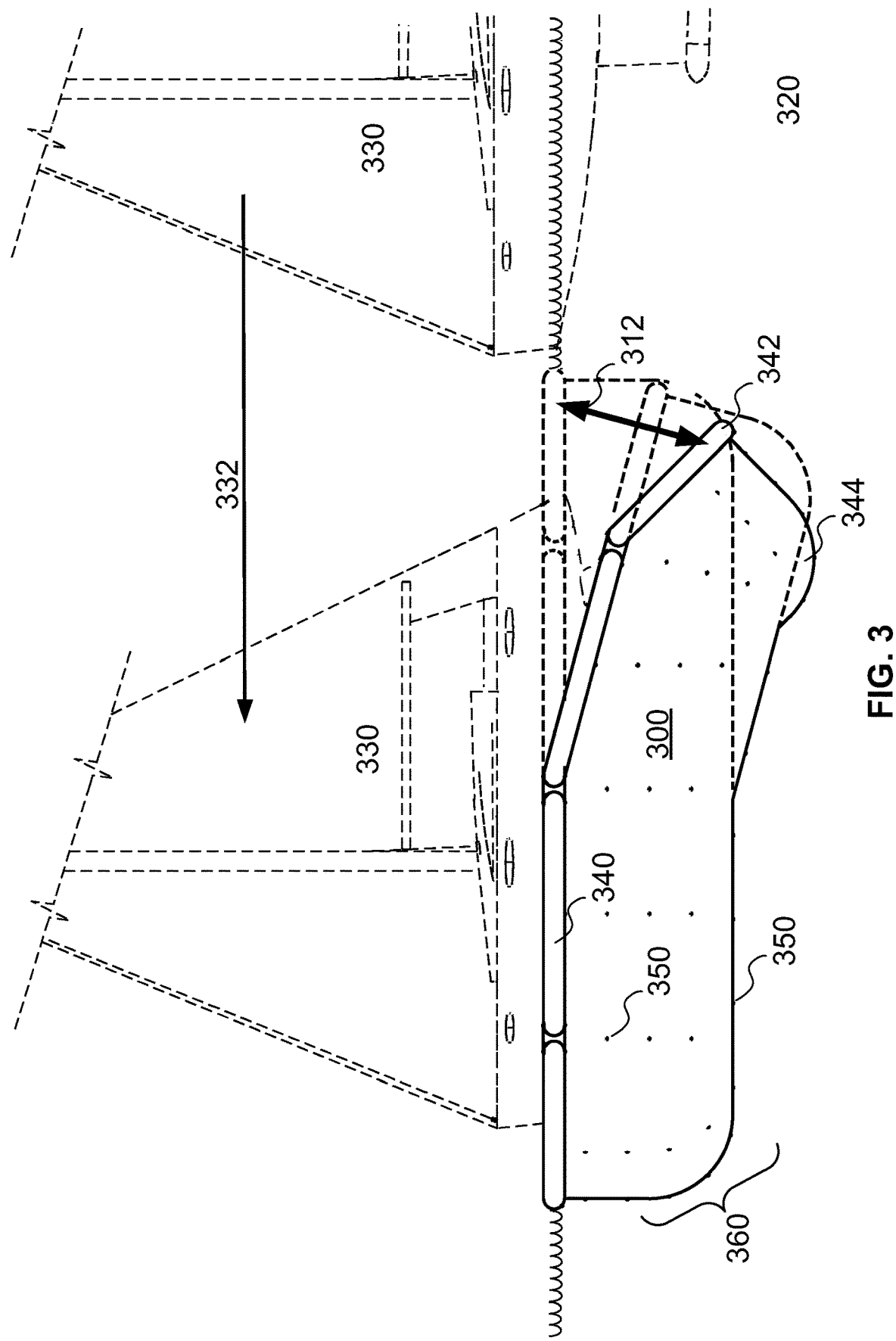
FIG. 3 is an example diagram showing a side view of a method of containing a target for segregation consistent with certain embodiments herein.

The system may be used to surround a target in numerous ways. In FIG. 3, a portion of the rim is sunk and the target moved into the system. Thus, FIG. 3 shows an example of the containment system and a vessel 330 entering the containment system. This action is shown by arrow 332 showing the vessel 330 moving in a forward motion, with the containment system 300 stationary. Alternatively, the containment system 300 could be dragged into position, while the vessel 330 is stationary (now shown). In any case, the method shown in this example, used to surround the vessel 330 with the containment system 300 is accomplished, for example, by lowering a portion of the rim 342 by submerging it beneath the water surface. Any number of portions of the containment system rim may be lowered beneath the water's surface by deflating one or more of the rim's air chambers, depending on the size and shape of the target.

As shown for example in FIG. 3, a portion of the rim is submerged low enough to clear the draft, or lowest submerged part of the vessel, 330, or target to be contained. This is done here, for example, by deflating a portion of the rim 340, and allowing a ballast (not shown) to pull down and sink the deflated rim sections. This action is shown by arrows 312 showing the portion of the rim moving up and down in the water. This deflation could include any number of techniques but FIG. 3 shows an example where submerging and sinking the rim is done via deflation valves. This deflation is shown in FIG. 3 by the lowered rim section 342 and the lowered containment system walls 344.

Once the rim is down, 342, the target to be contained, here a vessel 330, is able to move into the containment system from water outside 320. Any combination of movements between the system and the target to be contained is possible, depending on the constraints of any connected pumps, environment, anchors, lines, etc. (not shown). Once a vessel 330 or target has entered the containment system, re-inflating the lowered rim segments 342 raises that submerged portion back to the surface and acts to contain the vessel and the water it is floating in, both at the surface, and beneath. This may be done using any number of techniques but this example shows the rim inflated via inflation valves. After the rim 340 is completely back to the surface, this would complete the segregation process, keeping the outside water 320, outside of the containment system 300 and the contained water (not shown) inside of the system.

Figure 4:
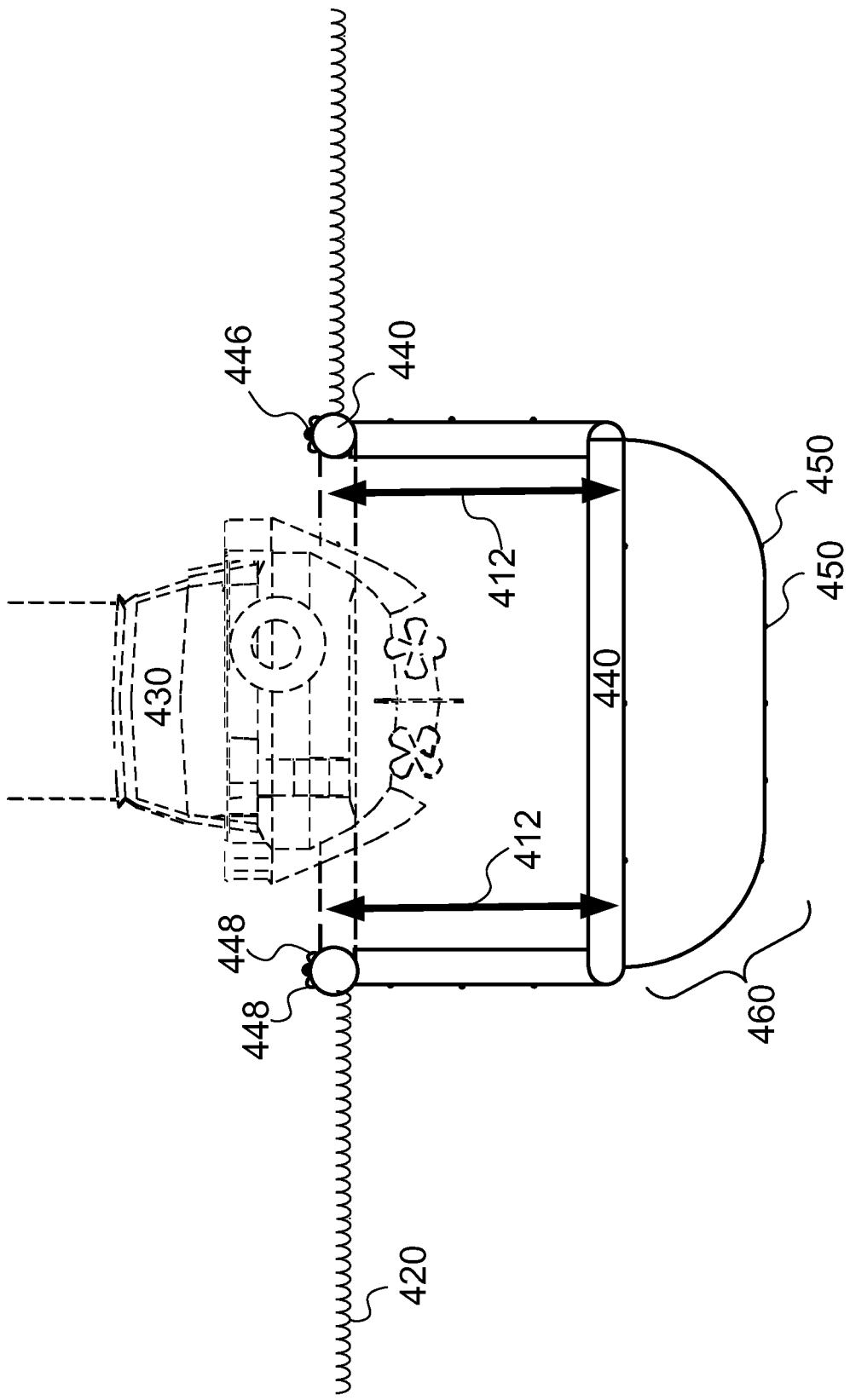
FIG. 4 is an example diagram showing a view of a method of containing a target for segregation consistent with certain embodiments herein.

FIG. 4 shows an example view of the containment system with one end lowered and submerged. In this example, the target is a vessel 430 that is within the containment system with the rim 440 at one end submerged and lowered in order to clear the draft of the vessel 430. This action is shown by an arrow 412 showing the movement of the portion of the rim up and down in the water. This can be done a number of ways, but in this example, the submerging and sinking of the rim is done via purge or deflation valves 448. These purge valves can be operated manually, by remote or wired control with servo motors or any kind of electrically or pneumatically operated valve mechanism. And here, in this example, only one end of the rim 440 is deflated, and therefore only that end of the containment system walls and floor material 460 drops below the submerged rim 440, allowing the water outside of the containment system 420, to mix with the water that surrounds the target or vessel 430. The dropping of certain parts of the rim 440 can be aided by the use of anchor points 450 which can be used to affix ballast in order to aid in sinking portions of the containment system. These anchor points could be eyes, cleats, buckles, or any form of device that can receive or affix a weight mechanism, as disclosed here.

By then raising the rim 440 to the surface, as shown by arrows 412, the water inside of the containment system can then be segregated from the outside water 420. This can be accomplished, in this example, by inflating the rim 440 via inflation valves 446 from some kind of pump (not shown).

This segregation can keep any leaks, spills, or materials coming from the vessel 430 as the source, from mixing with the surrounding water 420.

Figure 5:
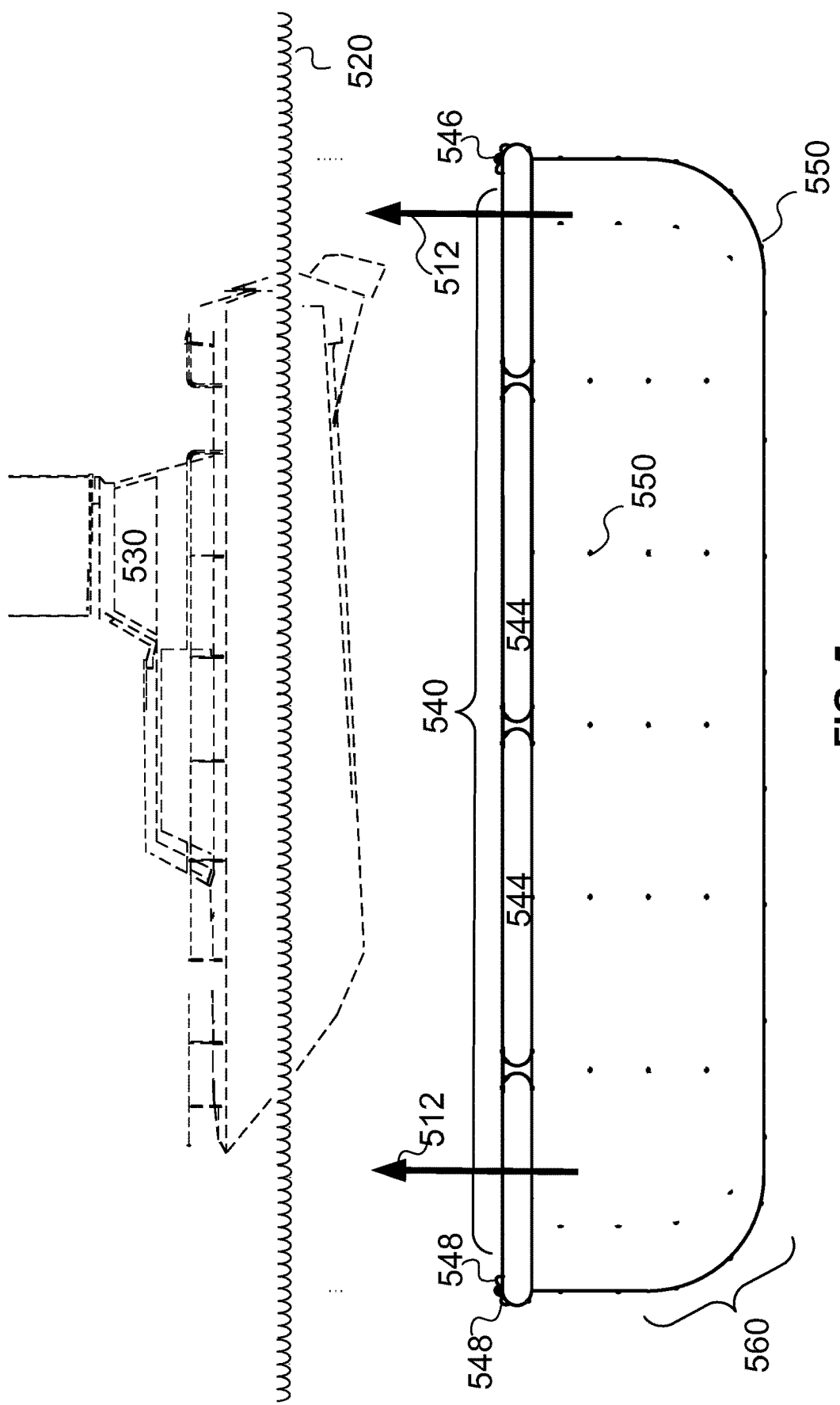
FIG. 5 is an example diagram showing a side view of an alternative method of containing a target for segregation consistent with certain embodiments herein.

FIG. 5 shows an example view of the containment system being put into place from beneath a floating vessel 530. This is to show an example method of containment, different than that shown in FIGS. 3 and 4, where a portion of the rim 540 is lowered, and other portions are not. In this example, the rim 540 and underlying containment system walls and floor material 560 contain are completely submerged and positioned beneath the vessel 530 or target for containment. The containment system is submerged through the use of deflation valves 548 that allow for air to escape the buoyant rim 540. In this example, all of the rim portions are deflated in order to submerge the entire system. Other embodiments contemplate any combination of inflated and deflated rim sections 544 in order to submerge portions or all of the system as described here. Coupled with optional ballast, which may be attached to any anchor points 550 on the rim 540 or walls or floor 560 of the system, to help sink the containment system and allow it to submerge. These anchor points 550 could be a cleat or eye or ring or any kind of point that may be used to tie or affix any kind of ballast or weight in order to aid in sinking the entire containment system. By regulating which sections 544 of the rim are deflated in what order, or at the same time, the containment system can be submerged at once or in sections. In this example drawing, the rim 540 segments 544 are all aligned, after the containment system is submerged.

And once submerged, as shown in the example of FIG. 5, the system can be positioned into place, either by moving the containment system or by moving the target or vessel 530 targeted for containment, or they both could move. Moving the containment system can be done manually, by divers pulling it into place, or by boat or watercraft pulling it into place. Further, in certain embodiments, the containment system is submerged and the target or vessel 530 is positioned above the submerged system. Also, the system can be positioned completely or partially beneath a vessel or pollution source, depending on the target and environment.

Again, a series of one or more buoys could be used to control the depth of the submerged system when deflated, movement of it into place and guide the ascent of the system upon inflation, around the target. These buoys could be placed in any number of portions of the rim to control the movement of the system, and could include any number of tethers, including but not limited to rope, line, elastic, pulley, etc.

Then, in certain embodiments, the inflatable rim 540 can be inflated via pumps (not pictured) through inflation valves 546 on the rim sections 544. This inflation then creates buoyancy in the rim 540 which floats up and surrounds the vessel 530. This action is shown by arrows 512. Once the rim is inflated and surfaced, the water outside of the containment system 520 is segregated from the water inside. Thus, any pollutants or runoff from the vessel 530, in this example, is kept from mixing with the outside water, 520.

Figure 6:
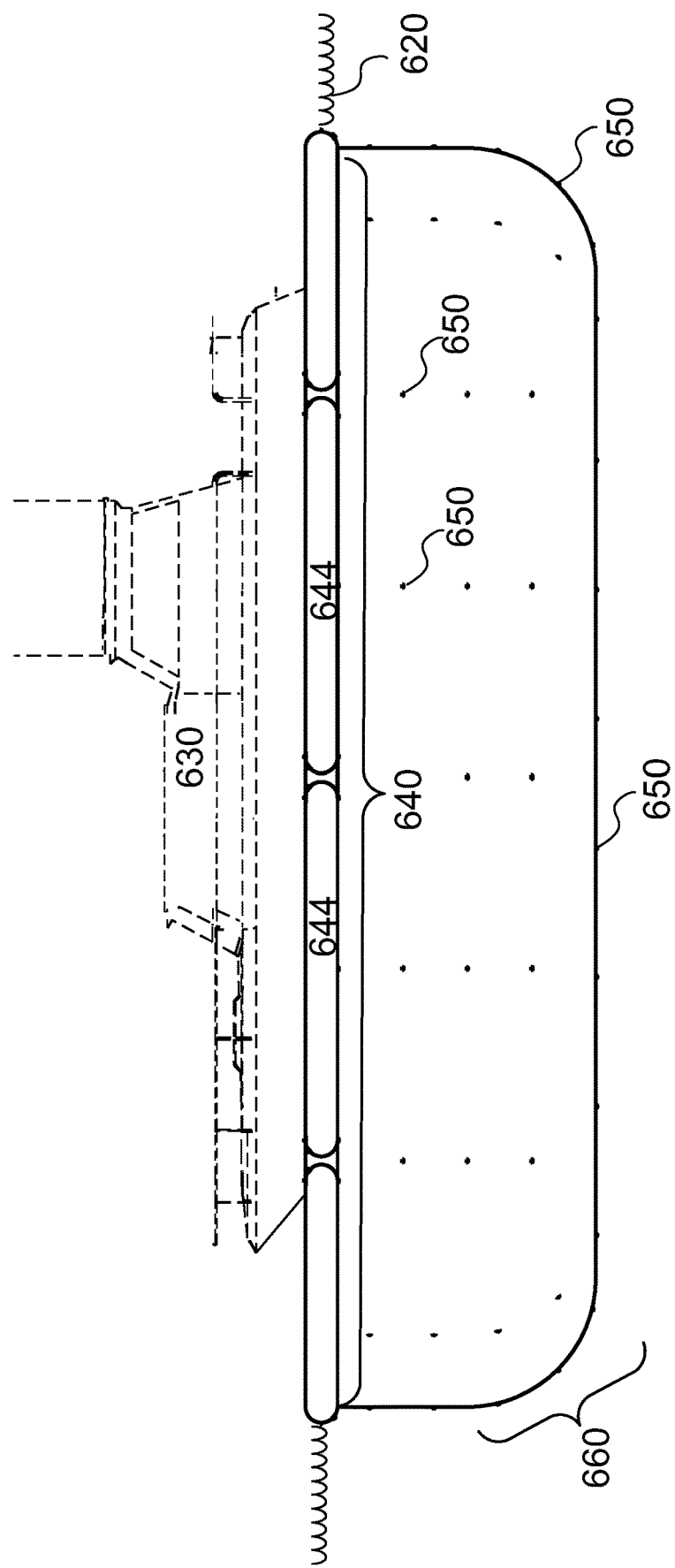
FIG. 6 is an example diagram showing a view of the containment system consistent with certain embodiments herein.

FIG. 6 shows an example embodiment of an outside side view from alongside the containment system, according to some embodiments. This example figure shows a vessel 630 inside the containment system buoyant rim 640 and containment system material walls and floor 660 beneath. In this example, the sections of the rim 644 are all floating on the surface of the water. In such a configuration, the vessel 630 is contained and segregated from the outside water 620. Thus, the rim 640 is floating on top of the water in such a way that no pollution or material coming from the vessel 630 is able to spill into the body of water 620 on the surface, because of the rim 640, but also underneath the surface, because of the walls and floor of the system 660.

Certain embodiments of the system can include anchor points 650 which may be located anywhere on the containment system walls or floor 660 or rim 640. These anchor points can be used to position both the target vessel 630 and the containment system itself, both the rim 640 and the walls and floor 660. Ballast may also be attached to anchor points 650 to hold it in place, move it, stabilize it, submerge portions or all of it, etc.

Figure 7:
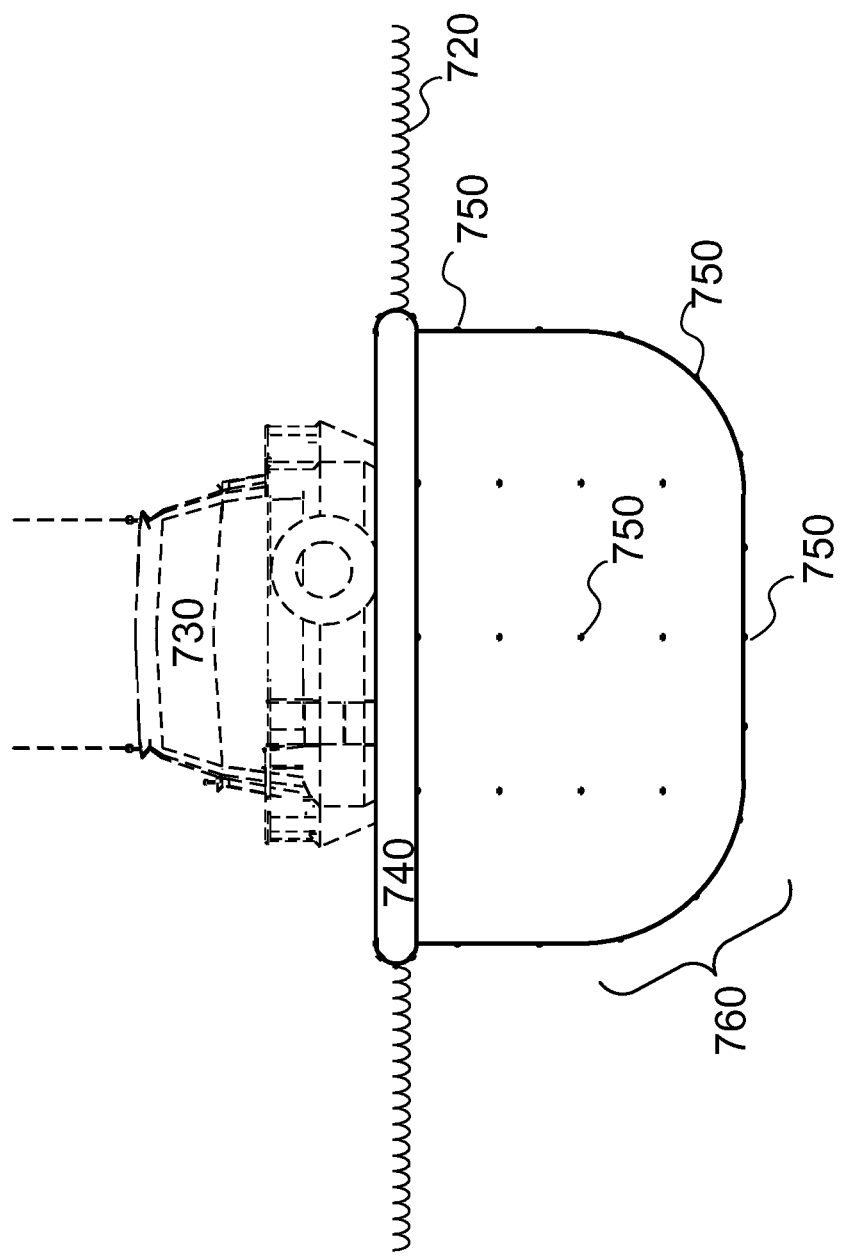
FIG. 7 is an example diagram showing a view of the containment system consistent with certain embodiments herein.

FIG. 7 is an outside view from the end of the containment system showing vessel 730 inside the containment system's buoyant rim 740 and containment system material 760 beneath. Anchor points 750 are found throughout the containment system for use in positioning both vessel 730 and the containment system itself. Ballast may also be attached to anchor points 750. FIG. 7 shows what the system could look like, when the target vessel 730 is contained in the system and the outside water 720 is kept out of the containment system. Thus, anything coming from or falling off of the vessel 730 is contained.

Other example embodiments of containing the target include a method of surrounding the target with the buoyant rim and underlying floor, and then pumping the water out of the system in order to collapse the walls and floor on the body of the target. In such a way, the water pressure from outside of the system will push the walls and floor up to surround and conform to the shape of the target. By doing so, the target could more easily be moved longer distances, more quickly, while containing the target, including any fluids, flotsam and jetsam that may otherwise be lost when attempting to move a target. In such a way, a wrecked boat or airplane for example could be sealed from below, and transported by dragging by a tug or other vessel, to another location, while keeping all parts of the target contained.

Containing the Pollutants and Filtering

Once the target is contained within the containment system, the segregation aspect is complete. That is, the water from outside of the system and the inside of the system are separated, both at the surface, and also below the surface. In this condition, certain embodiments allow for divers to conduct maintenance work on the target, to conduct repair work or build work on the target, or simply to contain an active pollution source. Automatic scrubbers could be used as well as robots or remote cleaning devices, etc. Actively polluting targets could be contained as well as potential polluters. Certain embodiments can then allow for the water within the containment system to be extracted and cleaned. This can be done by any number of pumping and filtration systems either integrated within the system, or separate and apart from the system, depending on the arrangement. The containment system could be coupled with any number of commercially available filtration systems, above and beyond what is disclosed here. And once removed, the contaminated material may be treated and the pollutants separated.

FIG. 8 shows an example embodiment of the containment system and a floating vessel 830, in the containment system from the side, cut away, view. This view shows the inside of the system, including how the rim 840 keeps the outside water 820 separate from the inside water 810 at the surface. Below the waterline, the walls and floor of the example system 860 are shown in place, keeping the water segregated under the surface. Thus, the containment system is in place and segregating the vessel 830 here.

Further, FIG. 8 shows an example of how the water can be extracted and filtered from the inside of the containment system. In this example, multiple intake sleeves 852 are grounded on the floor 860 of the containment system. They raise up and out of the system, providing a conduit for the contaminated water to be pumped out of the system. Inside the example sleeves 852 are intake hoses 856 which can, via a pump system (not shown) draw water from the inside of the containment system, through filtered or screened inlets 854. These integrated intakes 854 can be screened to collect larger particulate and protect the pumps or keep large matter out of the filters if they are present. The water can then be removed and filtered or cleaned in any way desired, as described below.

The example removal system in FIG. 8 shows the sleeves and hoses running up and out of the system but anchored to the floor of the system. This arrangement could be any kind of arrangement, with hoses and sleeves attached to the walls, or running along the floor of the system. Further, the removal system could include sleeves and hoses that are not attached to the floor or walls of the system but are detached and movable. Such a system may include weighted ends of the hoses and sleeves, to drop them to the floor of the system, and allow the water and pollutants to be pumped out. Additionally, the positioning and number of the screened intake holes 854, could be arranged in any manner on the hoses and sleeves. They could be arranged at only the bottom of the hoses and sleeves, or along the length of the sleeves and hoses.

Filtration systems completely unattached may also be used with the containment system design. Filtered water may be either returned into the containment system, creating a closed circuit filtration system or water may also be discharged outside of the containment system after filtration. When filtered water from the containment system is released back into the surrounding water or elsewhere, an equal flow of water into the containment system is necessary in order to maintain a desired volume of water within the containment system.

Figure 9A:
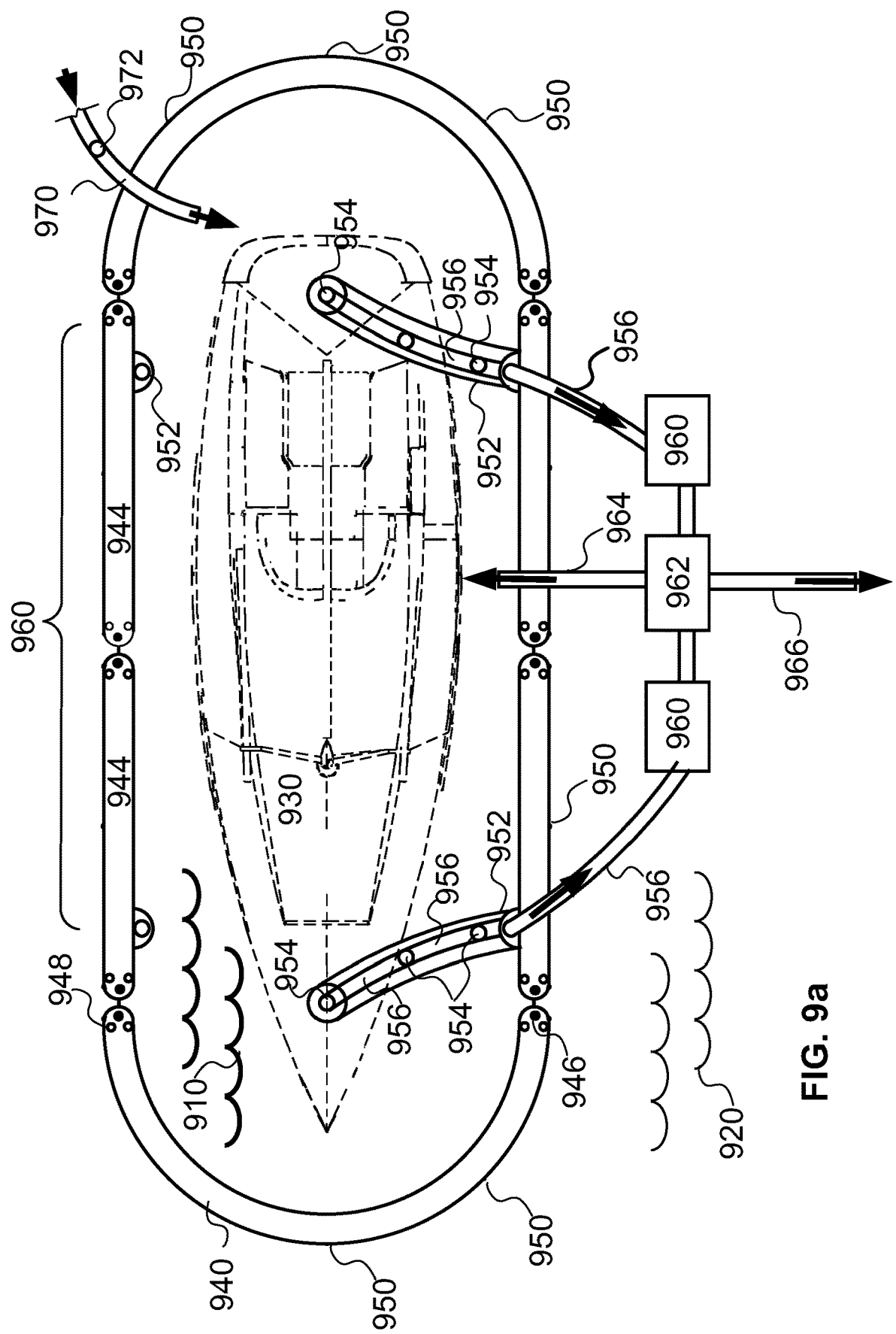
FIG. 9a is an example diagram showing a top down view of an off-board pump/filter arrangement of the containment system consistent with certain embodiments herein.

FIG. 9a shows an example embodiment of the containment system with a floating vessel contained. Thus, in this example, a floating vessel 930 is contained inside the system including the buoyant rim 940 and containment system walls and floor material (not pictured). This containment system thus keeps the pollution in the system and segregates the target and its pollution from the outside water 920. This example embodiment has an off-board pump and filtration system in order to treat and clean the contained water 910. In this way, the off-board pump and filtration system can be located on a dock, for example (not pictured), or on the land, or a barge, or any number of other off-board locations.

In the example pictured in FIG. 9a, the rim 940 can be inflated with air, for example, through inflation valves 946. This creates a buoyant rim that floats on the surface of the water to stop pollutants from floating away, but also keeps outside flotsam and jetsam out of the containment system. This buoyant rim 940 is broken into segments, 944, in this example. This compartmentalization can allow for segments of the rim to be deflated and dropped below the water line for any number of reasons. This can be accomplished by releasing air form the rim 940 with the use of deflation valves 948.

Further, in FIG. 9a, the example containment system includes any number of anchor points 950 located throughout the containment system. These anchor points can be used for positioning both the vessel and containment system. Also, the anchor points 950 may be used to attach ballast, weights, or drift nets in order to keep the system in place, or aid in the lowering of segments of the rim 944, in conjunction with the deflation of the rim segment. Further, anchor points could be used to tether the system to any kind of outside element such as but not limited to a dock, another vessel, the land, a buoy, another containment system, etc.

In FIG. 9a, the filtration system includes integrated intake sleeves 952, intake screens 954 and intake hoses 956 that can allow the water to be pumped up and out of the system by external pumps 962 and through external filters 960. Similar to FIG. 8, these sleeves and hoses may be anchored to the floor of the system and run up and out as a conduit for pumping contaminated water. Once out of the system the water can be run through any kind of filter 960. In the depicted example, there are two filters operated by a single pump. Any combination and number of filters and pumps can be used, the configuration of them in FIG. 9a is not to be limiting.

Once filtered, the water could be returned to the containment system, or pumped overboard to the external water body, or any other kind of storage. Further, in certain embodiments, the water is not filtered, but merely pumped out of the system.

In this example, shown in FIG. 9a, two options of water disposal are shown in use at once. Here, after the pump 962, filtered water may be returned into the containment system through a water return 964 or directed outside of the containment system using a filtered water out hose 266. These options could be used as alternatives, returning the water to the system, or pumped out, or they could be used in unison.

Further, as shown in FIG. 9a, the example system has water being removed from the containment system. Thus, the containment system, in this example, is losing water and the walls of the system may begin to collapse against the vessel, when in use. Therefore, in this example, a water input system may be used to keep the volume of the water inside of the system relatively constant in order to keep the walls of the system away from the vessel hull. Here, water may be introduced into the containment system with a water input 970 and regulated with a water input valve 972.

Figure 9B:
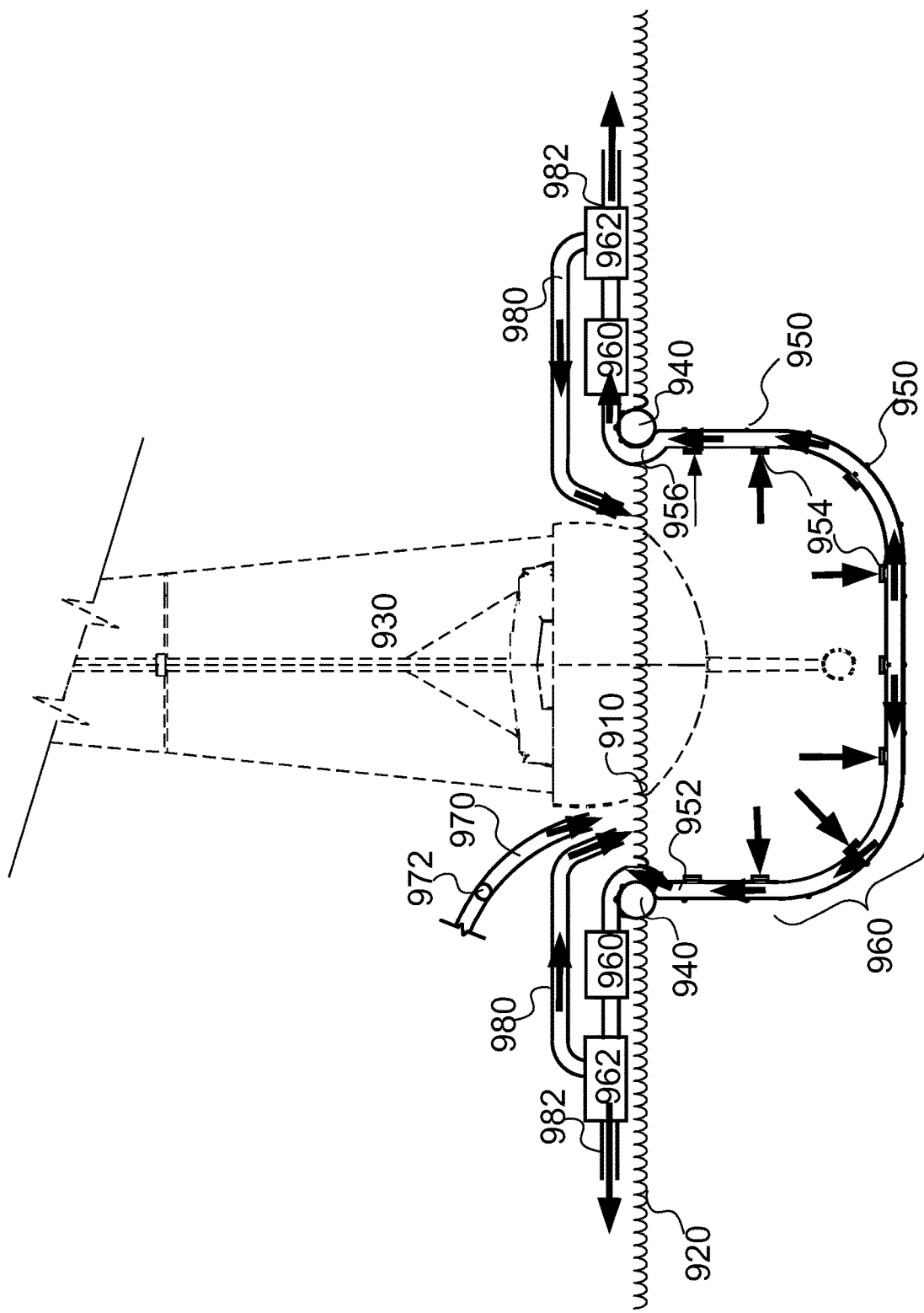
FIG. 9b is an example diagram showing a side view of an alternate off-board pump/filter arrangement of the containment system consistent with certain embodiments herein.

FIG. 9b shows an alternate embodiment example cross sectional view spanning the width of the containment system. This diagram shows the containment system design outfitted with an integrated filtration intake system while filtration and water propulsion of the filtering system are shown off-board. Thus, instead of the intake sleeves and hoses shown attached to the bottom of the floor of the system, the intake is done through spaces in the walls and floor of the system itself. Thus, in FIG. 9b, there are no hoses running through the middle of the system, but all of the removal is done via the walls and floor 960.

Thus, in FIG. 9b, segregated and contained water 910 and a floating vessel 930 are contained within the buoyant rim 940 and containment system material 960 beneath.

In FIG. 9b, the example includes a filtration sleeve system 952 integrating the filtration intake screens 954 and intake hoses 952 within the containment system walls and floor 960. Thus, intake hoses 952 embedded in the walls of the system can bring contained water 910 to the filters 960 and pumps 962, which are shown separate, and off-board from the containment system rim 940. And just as in the example embodiment of FIG. 9a, a filtered water return 980 connects to the pumps 962 and returns filtered water to contained water 910. The filtered water may also be deposited outside of the containment system using a filtered water output 982 shown after each pump. Surrounding water 920 is shown separate form contained water 910.

To maintain the water volume within the walls of the system, as shown in FIG. 9b, water may be introduced into the containment system with use of a water input 970 which is regulated with the use of a water intake valve 972. Inside contained water 910, a diver (not shown) is able to perform hull cleaning, repair, zinc replacement or any kind of maintenance on vessel 930.

Figure 9C:
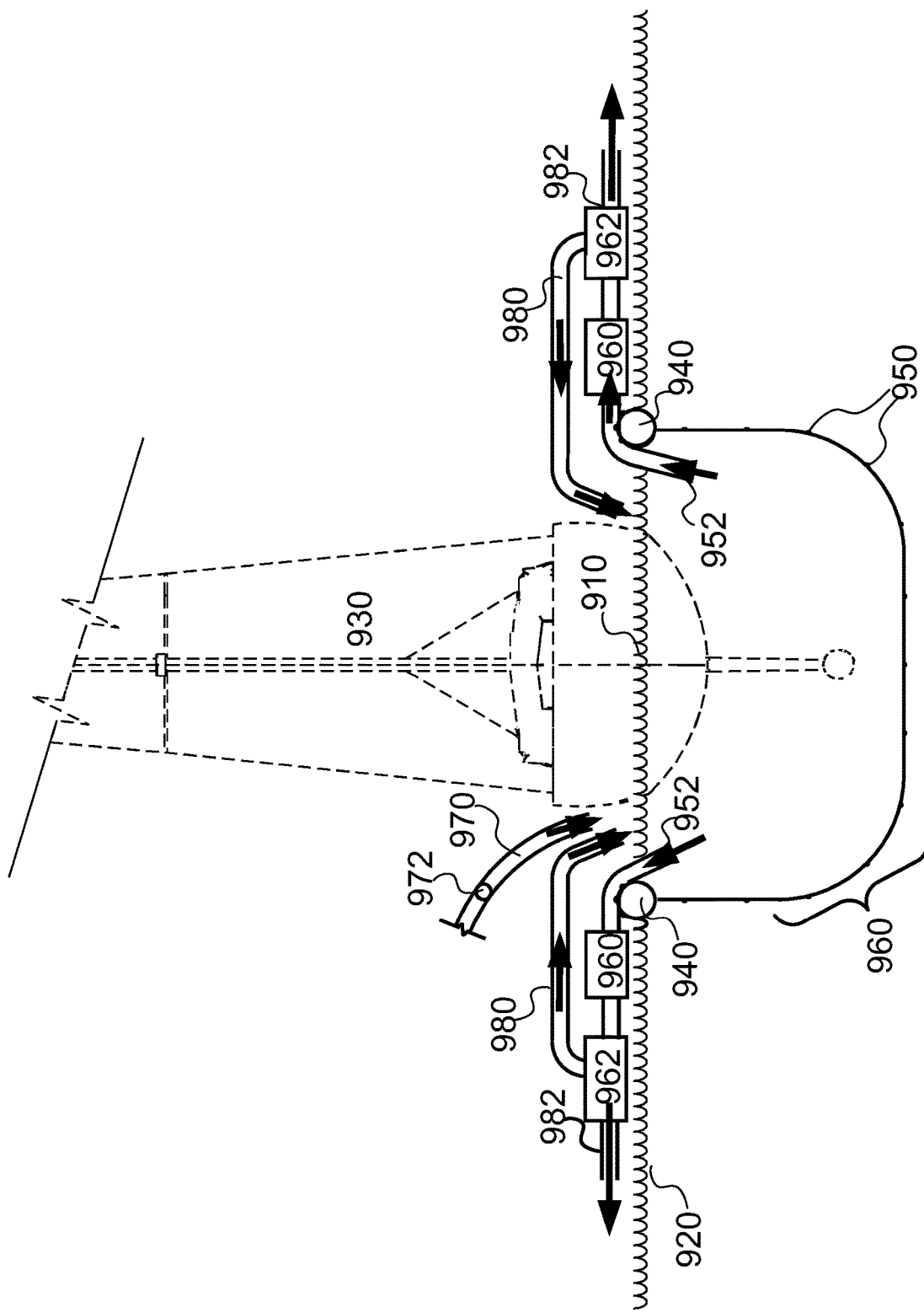
FIG. 9c is an example diagram showing a side view of an alternative off-board pump/filter arrangement of the containment system consistent with certain embodiments herein.

FIG. 9c is a cross sectional view of another alternate embodiment of FIGS. 9a and 9b spanning the width of the containment system of another alternate embodiment. In this example, the containment system walls and floor 960 do not contain the integrated intake hoses or the inlet filters. Instead, in this example embodiment, the walls are only the thickness of the material. The containment system is shown with a separate or unattached filtration system showing contained water 910 and a vessel 930 within the buoyant rim 940 and containment system material 960 beneath. Inflation valves 946 and deflation valves 948 allow the buoyant rim 940 to be inflated and deflated. Anchor points 950 are found throughout the containment system for use in positioning both vessel 930 and the containment system itself. Ballast (not shown) may also be attached to anchor points 950. Separate from the containment system itself is the filtration system. Separate intake hoses 952, not integrated into the walls of the containment system bring contained water 910 to the filters 960 and pumps 962, which could be mounted anywhere including atop the containment system rim 940. A filtered water return 980 connects to the pumps 962 and returns filtered water to contained water 910. Filtered water may also be deposited outside of the containment system using a filtered water output 982 shown after each pump. Surrounding water 920 is shown separate form contained water 910. Water may be introduced into the containment system with use of a water input 970 which is regulated with the use of a water intake valve 972. Inside contained water 910, a diver (not shown) is able to perform hull cleaning, repair, zinc replacement or any kind of maintenance on vessel 930.

Figure 10A:
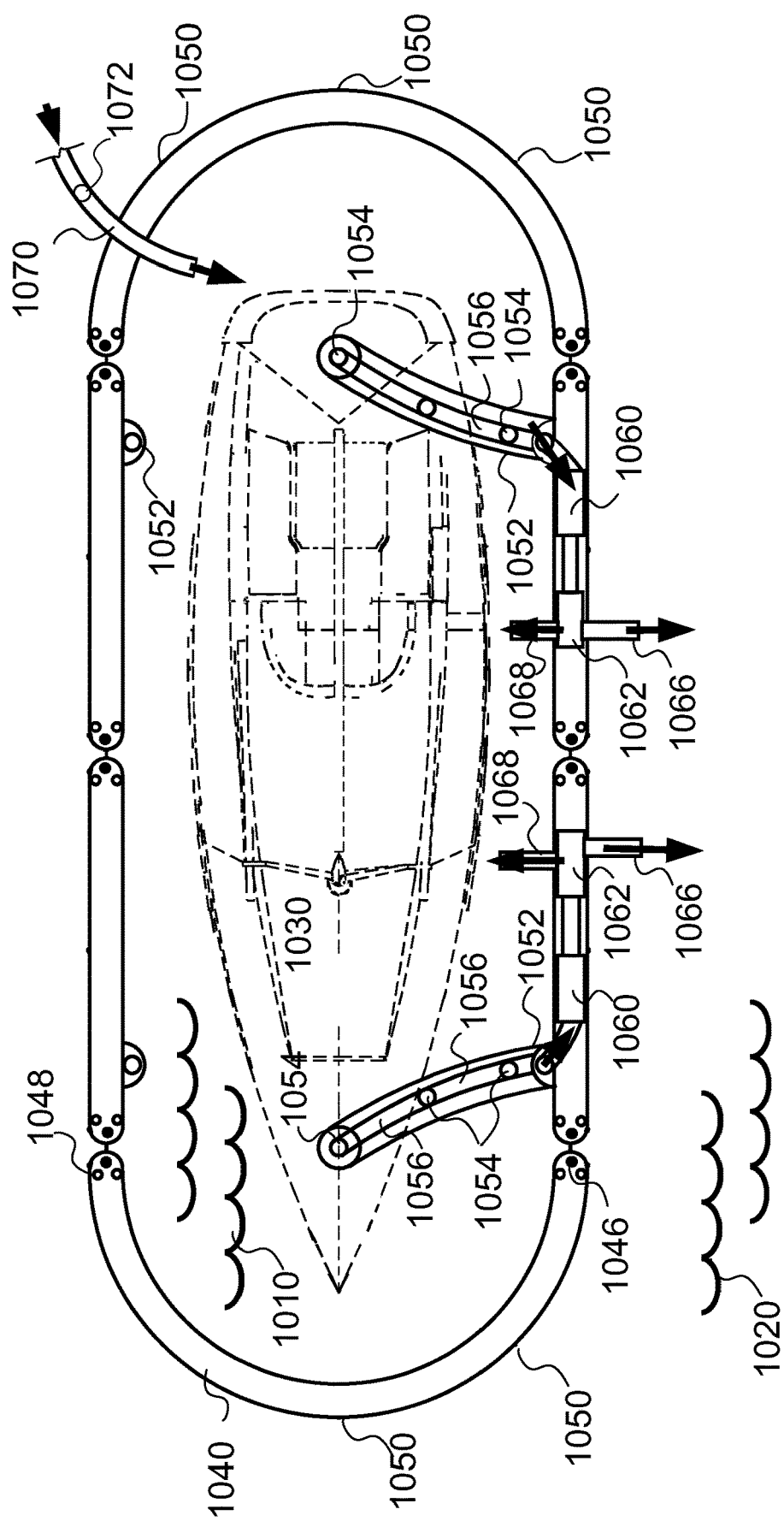
FIG. 10a is an example diagram showing a top down view of an integrated pump/filter arrangement of the containment system consistent with certain embodiments herein.

FIG. 10a shows an example alternate view of the containment system in which the pumps and filters are integrated with the rim. Attaching filters and pumps on the containment system itself, and within its walls may be desired to further reduce the risk of an outside spill of contaminants. Thus, the entire system in FIG. 10a is self-contained and limits contamination spread.

For example, in FIG. 10a, the contained water 1010 and a vessel 1030 are segregated inside the buoyant rim 1040 of the containment system. The rim 1040 is inflated with air through inflation valves 1046, in this example.

Anchor points 1050 may be found throughout the containment system for use in positioning both vessel 1030 and the containment system. These anchor points could be any number of eyes, loops, cleats, or any other kind of tie down or system to attach or affix a line, a rope, a weight, or anything else. Ballast weights on the anchor points can help submerge portions or all of the containment system when so desired.

In this example, a filtration sleeve 1052 is integrated with the containment system walls and floor. The sleeve 1052 runs from the floor of the system, over to the rim 1040 and then up, on top of the rim 1040. Intake screens 1054 and intake hoses 1056 in this example, are positioned to bring water that is contained in the system, up and out of the system to filters 1060 via any kind of various pump or pumps 1062. In this way, the water which surrounds the vessel, 1030, which may contain pollutants and material which is desired to be kept from the outside water, 1020, segregated and then treated.

The arrangement of the sleeve, 1052, the intake hoses 1056 could be placed anywhere in the containment system. In FIG. 10*a* there are two of them affixed to the center floor of the system. But any arrangement of intake could be used, such as a series of intakes crisscrossing the walls or floor of the system. Further, in some examples, there could be just one intake system. Other examples incorporate more than one intake system, which can be used to remove water from the system.

Additionally, the filters 1060 could be any kind of filter used to remove any kind of undesirable pollutant or material from the water surrounding the target or vessel 1030. For example, a filter could be used to remove heavy metals, or oil, or particulate matter of any kind. Then, in this example, the water runs through the pumps 1062, and may be directed back into the containment system via any kind of filtered water return 1068 or filtered water may be deposited outside of the containment system, back to mix with outside water 1020, using a filtered water out line 1066, for example.

When water is removed, such as the example in FIG. 10*a* where the filtered water is pumped out of the system and back to the outside water 1020 via water out lines 1066, the inside of the containment system would begin to deplete the water used to float the vessel 1030. Because of this, and possibly in order to avoid the walls and floor of the containment system from touching the vessel, or to keep a particular distance between the vessel hull and the walls of the system, more water could be introduced. In this example, a water input 1070 source brings water into the containment system and can be regulated through water intake valve 1072. In this way, the inside of the contained system could be kept at a particular volume. Alternatively, the system could be completely pumped out and no water introduced to offset the removed water. In such a case, the floors and walls of the system may collapse around the vessel or target as the water pressure from outside of the system increases, relative to the pressure of the water inside the system. The behavior of such a collapse of the system would be dictated in part by the material that the walls and floor are made of as well as the conditions outside of the system.

In the example of FIG. 10*a*, the filters 1060 and pumps 1062 are all integrated into the system, meaning that they are affixed to the rim 1040 of the containment system itself. This could be permanently affixed or removably affixed, depending on the parameters of the system. If the filters 1060 and pumps 1062 are removably affixed, they could be attached after the containment system is completely in place, and the rim 1040 floated to the surface. These filters 1060 and pumps 1062 could be any number of shapes or sizes, allowing for them to be integrated on the rim 1040 of the system. They could be powered in any way, such as electrically plugging into an outside source. Further, in one example, solar panels are affixed to the pumps or filters, or to the vessel 1030 and used to power the pumps.

Figure 10B:
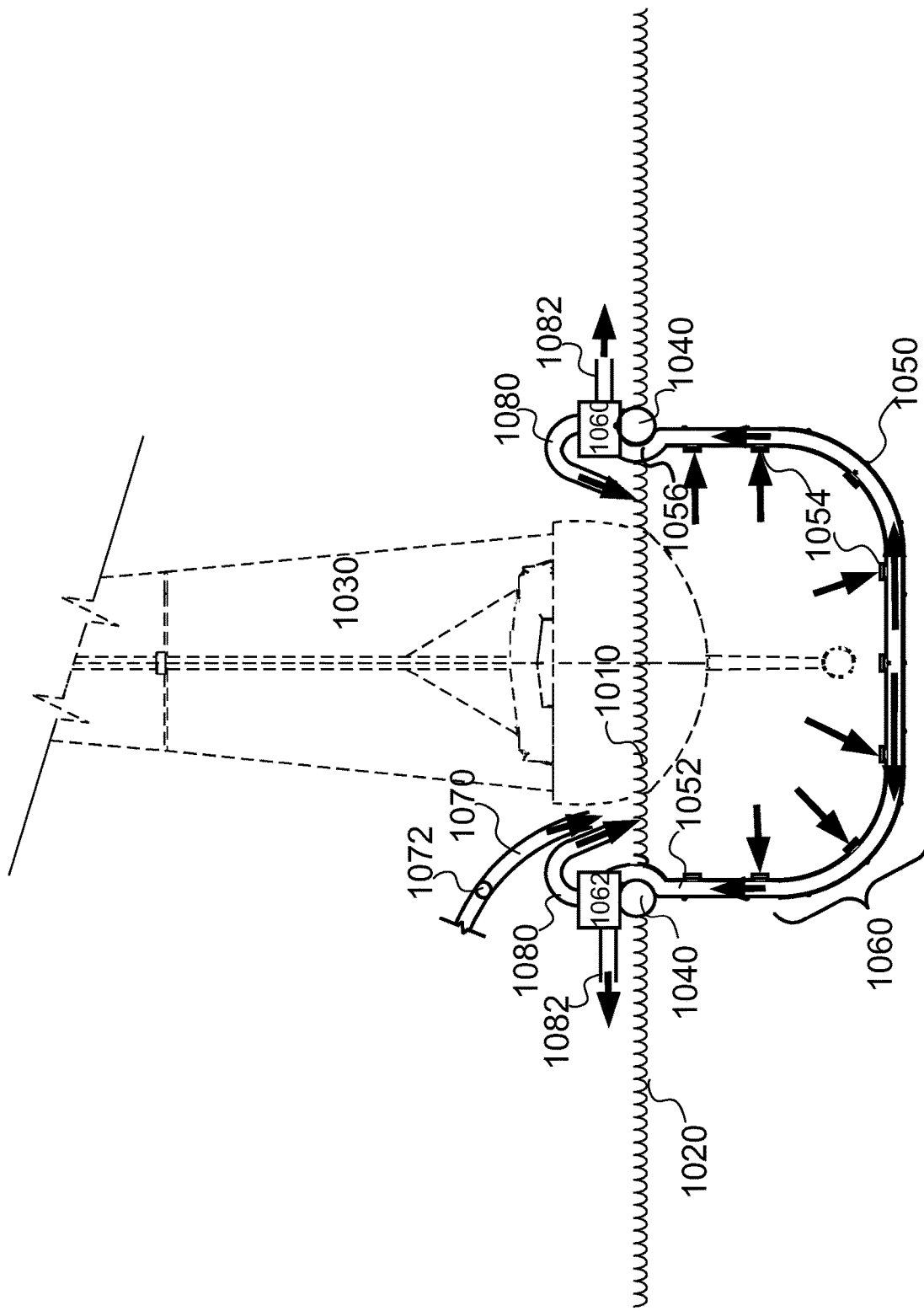
FIG. 10b is an example diagram showing a cut away side view of an alternate integrated pump/filter arrangement of the containment system consistent with certain embodiments herein.

FIG. 10*b* is cross sectional view of FIG. 10*a* spanning the width of the containment system, showing the containment system design with a fully integrated filtration system. Unlike FIG. 10*a*, where the intake sleeves and hoses are separate and attached to the floor of the system at one end, here the walls of the system itself 1060 contain chambers that act as intake hoses 1056. Contained water 1010 and a vessel 1030 are within the buoyant rim 1040 and containment system material 1060 beneath. Inflation valves 1046 and deflation valves 1048 allow the buoyant rim 1040 to be inflated and deflated. Anchor points 1050 are found throughout the containment system for use in positioning both vessel 1030 and the containment system itself. Ballast (not shown) may also be attached to anchor points 1050. A filtration sleeve 1052 integrates the filtration intake screens 1054 and intake hoses 1052 with containment system walls and floor 1060. Intake hoses 1052 bring contained water 1010 to the filters 1060 and pumps 1062, which are shown mounted atop the containment system rim 1040. A filtered water return 1080 connects to the pumps 1062 and returns filtered water to contained water 1010. Filtered water may also be deposited outside of the containment system using a filtered water output 1082 shown after each pump. Surrounding water 1020 is shown separate form contained water 1010. Water may be introduced into the containment system with use of a water input 1070 which is regulated with the use of a water intake valve 1072. Inside contained water 1010, a diver (not shown) is able to perform hull cleaning, repair, zinc replacement or any kind of maintenance on vessel 1030.

Tethered Embodiments

FIGS. 11*a* and 11*b* depict an example embodiment where a series of buoys and/or floats are used to guide the raising and/or lowering of the rim. In this example, the rim section 1142 could be tethered to any kind of buoyant device such as a buoy 1160 or floats that work in conjunction with the optional rim section ballast. In such an example, the buoys 1160 and/or floats could be tethered 1162 to the rim section 1142 that is ballasted and ready for sinking. Upon deflation of that section of the rim, the ballast (not pictured) could sink that end portion of the rim. The sinking could be controlled by a tethered buoy, which could stop the fall of the rim edge at the length of the tether. FIG. 11*a* shows an example with the rim section 1142 sunk and the buoy 1160 tether 1162 holding the rim section 1142 in place under the water.

Then, upon inflation, that section of the rim could float up, slacking the tether while the line may guide the rim section up toward the buoys. FIG. 11*b* depicts the system with the buoy 1160 behind the raised rim section 1142. In this example position, the tether 1162 is retracted or slacked. Some examples could include an elastic tether, a pulley and tether or a tensioned tether, that could be weighted to allow the rim edge to drop when deflated and ballasted but be able to exert force on the ascending and inflating rim edge to guide it back to where the buoys are located.

The buoy in FIGS. 11*a* and 11*b* are only exemplary to show how one embodiment may be used to guide the raising and lowering of a rim section. Any section of the rim may be positioned with help from these buoys, or the entire system could be sunk and guided using similar examples. Also, any number of buoys and/or floats could be used in any combination around the rim of the system. Another embodiment may have non floatable but instead fixed items that the system is tethered to in order to guide the raising and lowering of the rim edge, or system. A dock, for example, could be tethered to a rim section, and although not necessarily floating, the dock could be used as a fixed point to stop the lowering rim section.

Buoyant Filtration Embodiments

Certain embodiments here also include buoyant filtration systems that may be placed in a marine environment to capture material from spreading. For example, such buoyant filtration systems may trap material such as a pollutant emanating from a specific source, while allowing other material to pass through, such as water. It should be noted that in this disclosure, the inventive aspects are not limited to containing pollutants in a body of water and the use of that example is not meant to be limiting but merely illustrative. Additionally, the use of the term pollutant is meant to mean the material the filters are supposed to capture, separate from the material that is meant to be cleaned, such as oil pollutant from cleaned water, as an example.

Figure 12A:
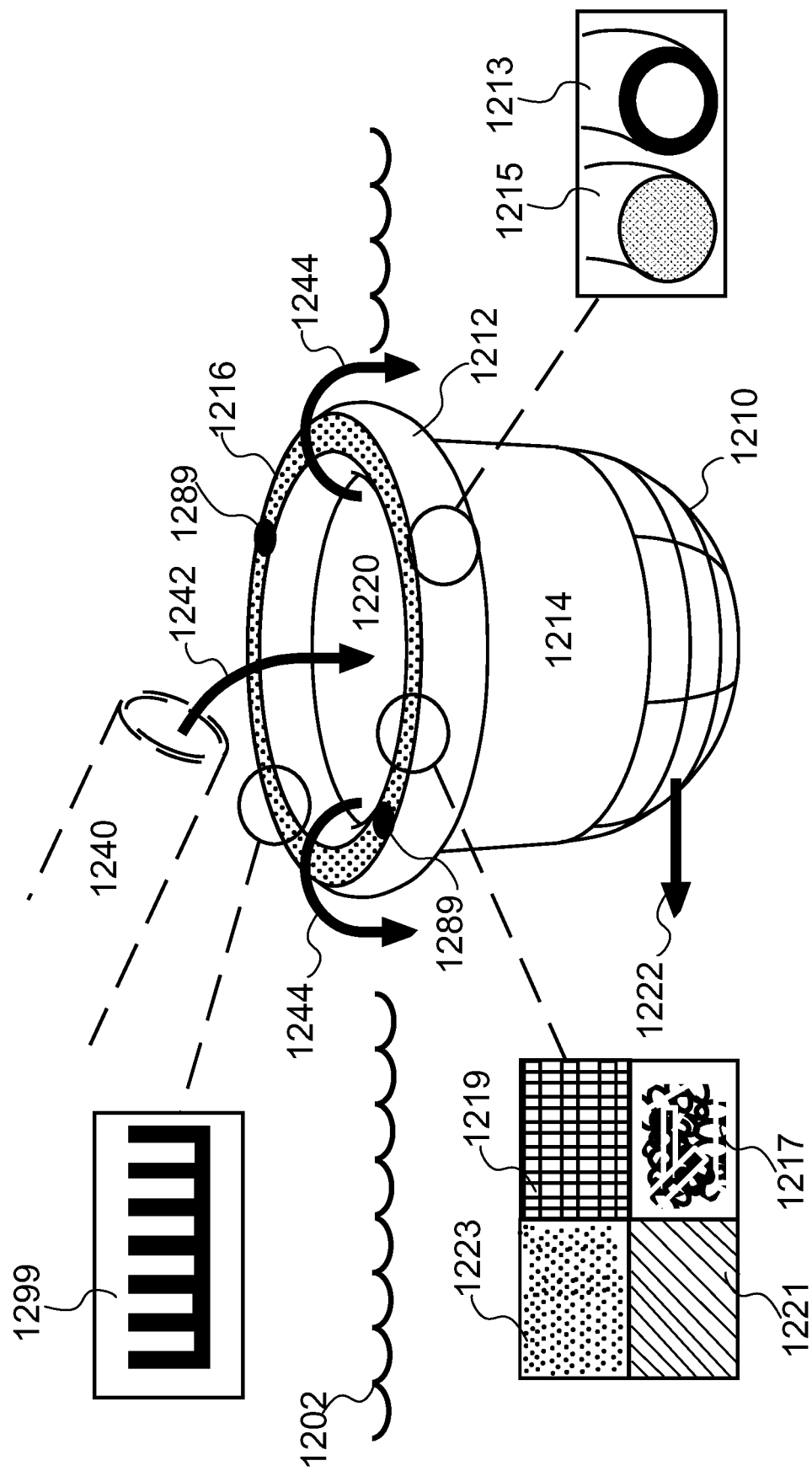
FIG. 12a is an example perspective diagram of a buoyant filtration system with rim filter consistent with certain embodiments herein.

One example embodiment of a buoyant filtration system is shown in FIG. 12A. In this example, the Figure shows the system with a buoyant rim 1212 floating in a body of water 1202 attached to a filtration system 1210 suspended from the buoyant rim 1212. In use, the example system is afloat in a body of water 1202 for example, and placed so as to be able to capture the target pollutant 1242. In this example, the system is placed under a pollutant runoff source, here a running hose 1240 but the target pollutant source could be any kind of source. As the system floats on top of the water 1202, the pollutants from the hose 1242 in the example, are collected in the filter 1220 and the water, if present, is allowed to pass into the water body 1222. In this way, the pollutants may be trapped in the filters but the system does not need to collect and hold all of the runoff, and the cleaned water is returned to the water body.

The buoyant rim 1212 could be made of any number of materials that float in the material in which it is to be used. For example, if the system is to be used in a harbor setting, in water, the buoyant rim would need to float on the water 1202. The rim 1212 could be made of any number of materials including but not limited to, plastic that itself is inherently buoyant, inflatable plastic 1213 cutaway detail, solid core closed cell foam 1215 cutaway detail, or a combination of any of these.

Additionally, the system example in FIG. 12A shows another filter system 1216 on top of the rim 1212. This could be used to filter overflow 1244 from the inside of the system 1220. Such a system could be used in conjunction with a submerged filter 1210, or separately by itself, or in any combination interchangeably, depending on many variables including the design of the system, the target pollutant, the source, the marine environment, etc. In the rim overflow example, the body of the system 1214 fills up with both the pollutant and water, and when full, begins to overflow the rim 1212. When this happens, the rim filters 1216 may catch the pollutant and allow the water to flow over the rim and back into the water body 1202. These rim filters could include any number of fibrous 1217, mesh 1219, plastic 1221, magnetic 1223, metal, or other kind of filter, that could be used to trap any number of liquid or particulate matter. A combination of these filters could be used to trap different materials such as those that float on water such as oil, in the rim filters 1216, and those that sink in water such as particulate matter, in the submerged filters 1210.

Figure 12B:
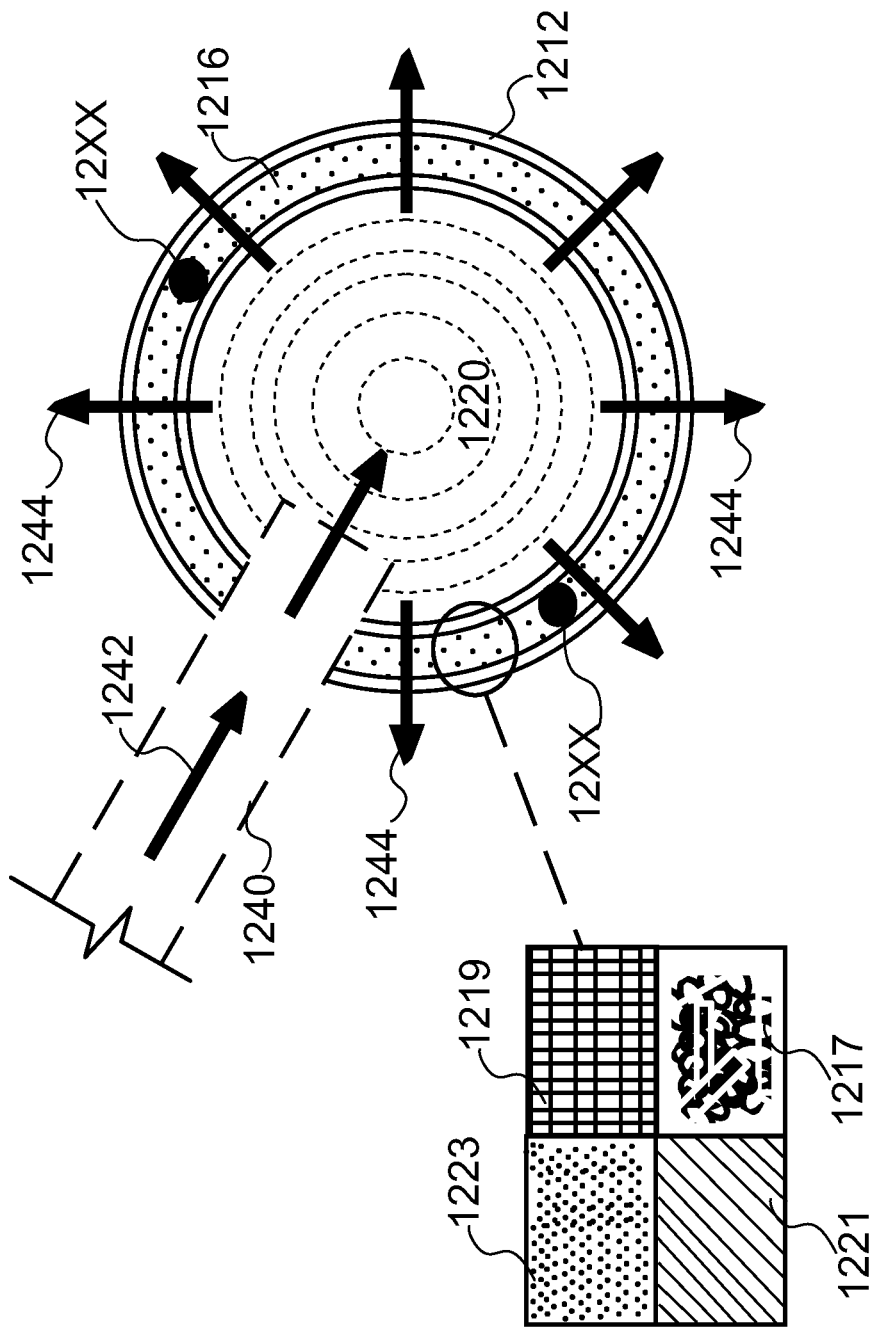
FIG. 12b is another example top down diagram of a buoyant filtration system with rim filter consistent with certain embodiments herein.

FIG. 12B shows a top down view of the filter system from FIG. 12A. Here, the rim 1212 is shown with the filtration portion 1216 on its top, and the overflow 1244, being filtered as it runs over the edge of the rim.

These rim filters could include any number of fibrous 1217, mesh 1219, plastic 1221, magnetic 1223, metal, or other kind of filter, that could be used to trap any number of liquid or particulate matter. The shape of the rim filters could be a flat lying filter 1216 or an upright filter with fins, brush, tubes or any kind of upright wall 1299 of filtering material. The filters 1216 could be embedded into the buoyant rim 1212 or could be detachably fixed, allowing for replacement, cleaning or interchanging of filters. The detachment could be in portions, or as a whole, around the entire rim. The detachable filters could be adhered to the rim 1212 with any manner of detachable systems including but not limited to magnetic, button, snap, hook and loop, threaded screw, slide-able, or any other detachable configuration 1289.

The body of the filtration system 1214 could take any shape and include any number of rigid or flexible shapes. The example shown is just one such example. The body 1214 could be a bag of flexible material made from plastic sheets or meshed or woven fabrics. The body 1214 could be a rigid material made from metals, plastics, wood, carbon fiber, etc. The body of the system could be impermeable as to the target contained pollutant, but could, in certain example embodiments, allow for water or the environmental material to permeate and enter the environment.

Figure 13A:
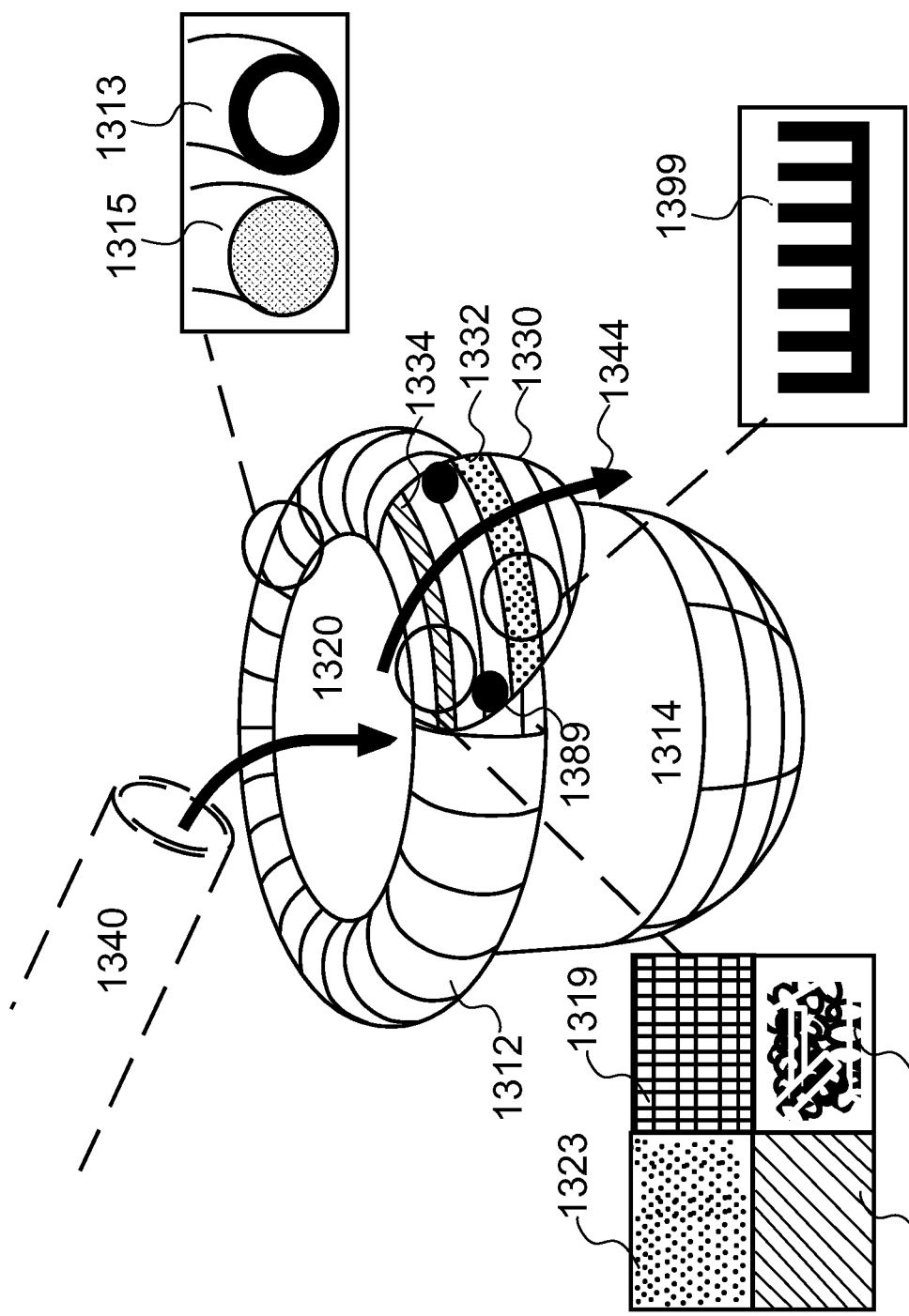
FIG. 13a is an example perspective diagram of a buoyant filtration system with spout filter consistent with certain embodiments herein.

FIG. 13A shows an example embodiment where instead of locating filtration systems along the entire edge of the rim 1312, a funneled channel or spout 1330 may be used to concentrate the overflow 1344 in a particular region of the buoyant rim 1312. In such a way, the filter or filters 1332, 1334, could be located in this funnel or spout, and direct the overflow instead of allowing overflow to spill over the entire rim area 1312 as shown in FIGS. 12A and 12B.

Thus, the example of FIG. 13A shows a pollutant source, in this case a hose or pipe 1340 discharging pollutant 1342 into the inside of the system 1320, as an example. Then, the spout or funnel 1330 located in one or more places on the buoyant rim 1312, directs the overflow 1344 into one place where the filter 1332 or filters 1334 can filter the overflow 1344. These filters could include any number of fibrous 1317, mesh 1319, plastic 1321, magnetic 1323, metal, or other kind of filter, that could be used to trap any number of liquid or particulate matter. The rim 1312 may be made of inflatable plastic 1313 cutaway detail, solid core closed cell foam 1315 cutaway detail, or a combination of any of these. The detachable filters could be adhered to the rim 1212 with any manner of detachable systems including but not limited to magnetic, button, snap, hook and loop, threaded screw, slide-able, or any other detachable configuration 1389.

It should be noted that the buoyant rim 1312 could have any kind of wall, flange, brush or fingers 1399 that stand up from the rim edge 1312 and help contain splashed pollutant in or waves out of the system. These rim walls could take any manner of shape and be detachably fixed to the rim 1312 to allow for customization, cleaning or replacement.

Figure 13B:
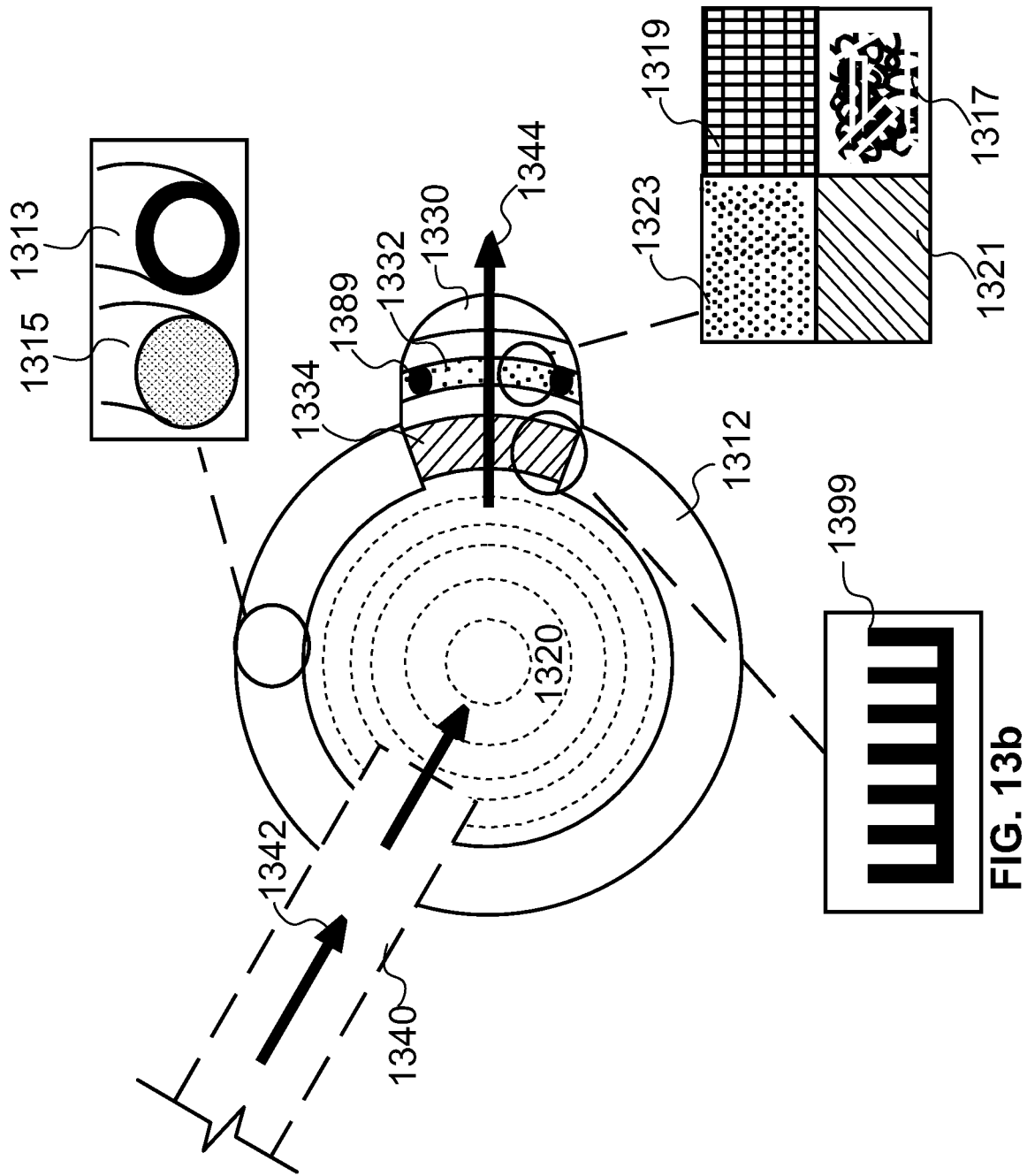
FIG. 13b is another example top down diagram of a buoyant filtration system with spout filter consistent with certain embodiments herein.

FIG. 13B shows a top down view of FIG. 13A.

Figure 14A:
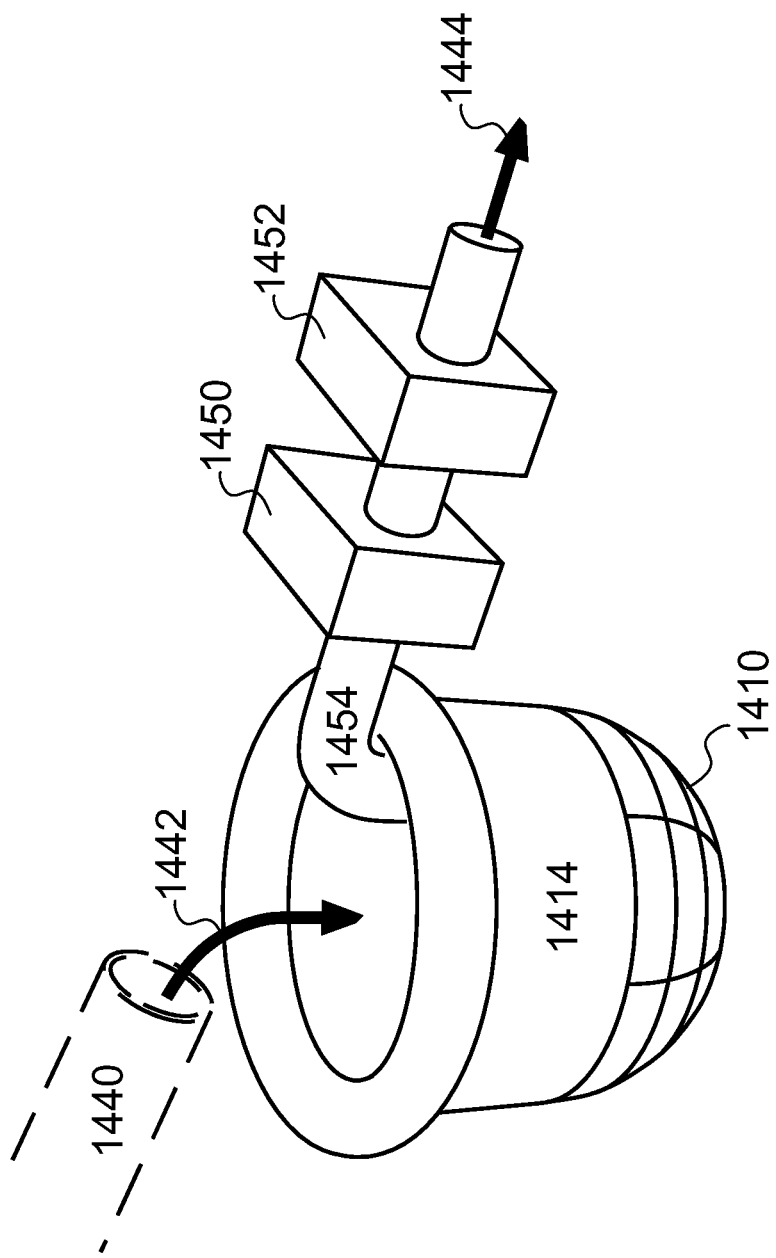
FIG. 14a is an example perspective diagram of a buoyant filtration system with pumped filter consistent with certain embodiments herein.

Yet another example embodiment includes the use of pumps and filters as shown in FIG. 14A. In such a way, the system does not gravity feed its own filters, but is aided by a separate filtration system and pump to remove the material and filter it.

Figure 14B:
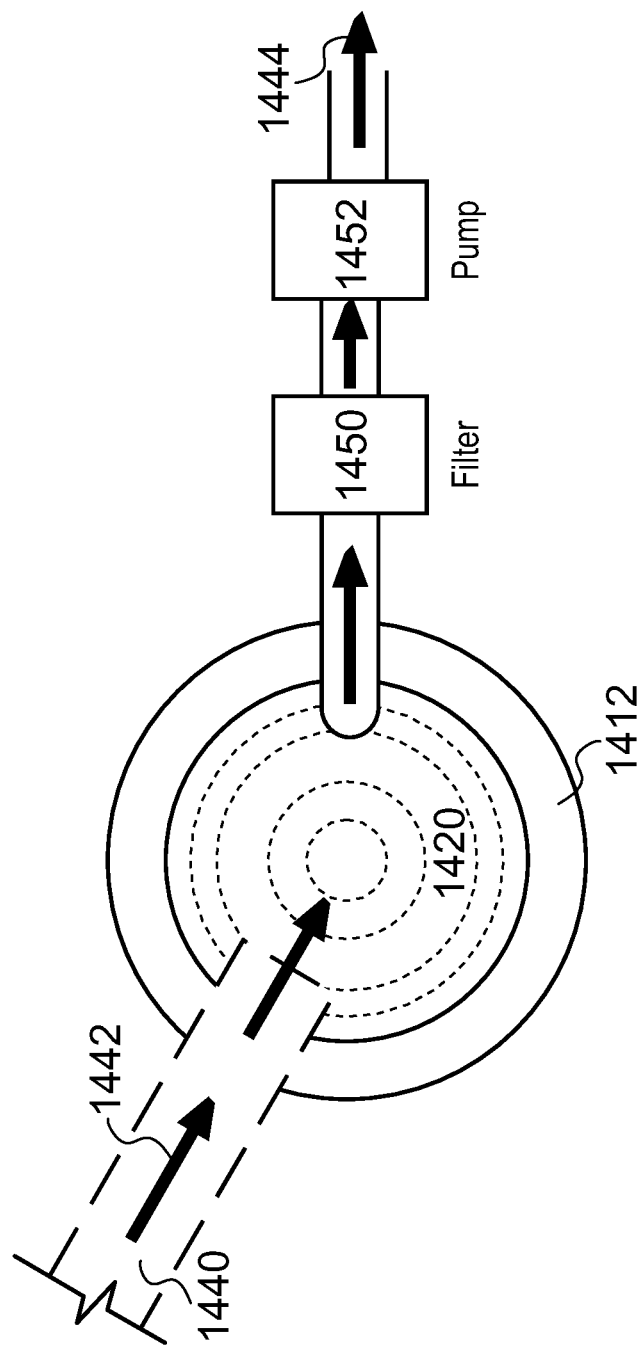
FIG. 14b is another example top down diagram of a buoyant filtration system with pumped filter consistent with certain embodiments herein.

In FIG. 14A's example, an embodiment shows a pollutant source 1440 spilling pollutant 1442 into the body of the buoyant rim containment system 1414. Here, there may or may not be a submerged filter 1410. This embodiment shows a separate filter 1450 outside of the system and a pump 1452 pulling contaminated water out of the system 1414 through a hose or pipe 1454. Thus, in this example, the filtered water 1444 is pumped out of the system via active pumps 1452 through the filter or filters 1450, instead of gravity flow as in FIGS. 12 and 13. In certain embodiments, the example in FIG. 14A and FIG. 14B could be combined with the rim filter of FIG. 12 or the rim funnel filter of FIG. 13 as a backup to the pumped and filtered embodiment of FIG. 14.

The filter 1450 could be one or more than one filter in one housing as shown or in numerous housings. Such filters could again be any number of filters used to remove unwanted materials from the water or material to be returned to the environment. Such filters could be fiber, mesh, wire, magnetic or any manner of filter used to filter unwanted material. Further, the pump 1452 could be any kind of pump, placed anywhere on the system hose or pipe 1454. Such a pump could use an impeller, a piston, be a centrifugal pump, a booster pump, or any other kind of pump suited for the job.

In certain embodiments, the suspended filter could be used with or replaced by or used in conjunction with a filtration system around the rim of the buoyant rim system. Thus, the suspended filters could be backed up by a filter system in case of overflow of the buoyant rim edge. Or, the buoyant rim could include an impermeable or semi-permeable suspended portion, forcing the target pollutant material to overflow intentionally, and over and/or through the rim's filtration system.

The examples in FIGS. 12A and 12B are merely illustrative. The buoyant filter system could take any shape and include many kinds of filters. For example, the filters could trap liquid pollutants such as oil, gasoline, wet paint, bilge water, among others. Additionally, the filters could trap particulate matter such as paint chips, metal shavings, among others.

Example filters may include, but are not limited to, Mesh, Micron, Carbon, Dispersants, Distill, Evaporative, Reverse Osmosis, Ceramic Filters, Mechanical Filtration, Granulated and Activated Charcoal, water/fuel separator, Chemical Dispersers, or any number of other kind of devices used to separate materials from one another.

Thus, the size and/or shape of the buoyant filtration system could be a range from a foot or few feet in diameter, for small pollutant sources, to many feet in diameter, which could be used to capture and filter much larger runoff, or runoff without a concentrated source. For example, a spattering, or splashing pollutant source, may require deployment of a larger filtration system than a small hose with a two inch diameter stream of pollutants. Thus, differently sized systems could be used for different sized requirements. Additionally, the figures show a circularly shaped buoyant rim, but the system could include any shaped rim and system. The rim could be a long oval, a square, a rectangle, or any shape used to fit the needs of the capture and filter. Thus, for example, an overflowing ledge may require a long trough of a system shaped like a rectangle. Or, for example, physical constraints of the placement of the system may require a particular shape to fit in between a dock and a boat, or a buoy. Any number of shaped buoyant rims could be used in similar fashion to the examples shown in the figures.

As the systems described above, the buoyant filtration system could be positioned and held in place using any number of ways including but not limited to hooks, eyes, latches, cleats, and/or tie downs. The system could be anchored to the bottom, or tethered to a nearby buoy or dock. The buoyant filtration system could be deployed by placing it under the pollutant source and securing its position by line, rope, bungee, anchor line, or any number of ways.

The filtration system suspended from the buoyant rim, connected to any of the vents or generally used on the rims or bag/wall/bodies could include the use of any number of filters, used to filter out different pollutants. Example pollutants to be removed from the system may include any number of contaminants such as metals, paint, petroleum and/or oil products such as diesel fuel, gasoline, propane, and battery acid. Others may be contaminated sea life, as in barnacles, allege, sea-weed, sea plants and animals potentially latent with heavy metals and other chemicals may be collected through the use of moving contained water through different sized mesh and also collected in the bottom of the containment system where they could be kept from escaping and can be collected any number of ways such as bagged by divers, pumped through mesh or scooped out by a back hoe etc.

For example, a suspended bag may have a meshed material for filtering out oil from water. As another example, a suspended rigid shape may contain a mesh that catches particulate paint chips, but allows water to pass. In these examples, the oil filter may be more dense than a looser meshed paint chip filter. General purpose filters could be used for rapid deployment, or special purpose filters may be used for specific pollutants.

Other example embodiments include filtering hazardous waste storage, sewage in connections or water treatment plants/centers/stations etc. Certain embodiments could also be used with boat waste pump out stations, such as those for sewerage systems. Others include contaminated water and or pollution can be collected through the use of a sump, drawn, pumped, absorbed, removed, distilled, evaporated, relocated etc.

Sorbents may be used to collect petroleum products such as oil or gasoline or diesel, etc. Natural organic sorbents could be used such as peat moss, straw, saw dust, feathers—readily available carbon products. Examples of natural inorganic sorbents may include clay, perlite, glass wool, and vercumlite. Synthetic Sorbent examples may include filters such as brushes, pads, diapers, sponges, etc. made from plastics, polyurethane, polyethane, and polypropylene. Certain examples include oil absorbent materials that may be made from melt-blown, non-biodegradable polypropylene. Forms of the filters could be any kind including mesh, brush, foam, strip, pad, sponge, carbon media, fabric, cloth, etc.

Certain example filtrations could use different kind of mesh and/or Micron filters. Such filters may be used to collect paint. Paint particulate matter may be removed though the use of different Micron filters composed of carbon, or natural or synthetic materials. Further example embodiments may include filter fabric configured to capture silt, sediment and oil as it flows from any source. Such example filter fabric may effectively contain both silt and sediment. Further, certain examples include spinning filters to remove particulates, screen, mesh, micron, brush, perforated material, fabric, permeable, semi-permeable, and non-permeable catchment.

Example embodiment removal could be through dispersants, temperature control, and/or freezing. Such removal could be for treatment, distillation, evaporation ponds, etc. through means of pumping, suction, pressure, man power, machine, robot, gravity flow when lifting container, for example.

Certain example embodiments could use collection devices such as skimmers used to collect pollutants lighter than the material the target is surrounded by. For example, an oil skimmer to skim floating oil on water. Other example embodiments may include oleophilic skimmers, suction skimmers, Weir Skimmer, etc. These skimmers could be included into a filter housing, and skim off materials as the water flows through, or they could operate independently, and be located in any number of areas such as the rim itself.

Certain example embodiments include the use of catch basins which may be used with or without filters. Such example catch basins could trap any number of things including but not limited to sediment, grease, bacteria, fungi, and any other material such as loose paint chips, organic material or others as described herein.

Example skimmers may include passive skimmers that are configured to absorb oil by floating on the surface of the water, for example. In such an example, once oil enters the water, the polymer in an absorbent forces oil to bond with the skimmer. Thus, in the example, after being bonded to the skimmer, absorbed oil may not filter back out if more water is added to the drain. For example, each passive skimmer may absorb any amount of oil.

Additionally, the system may adhere the filter directly to the buoyant rim, or allow for the removal of the filter from the buoyant rim. In such an example, the filter could be attached but be detachable to be able to switch filter types, or switch filters that are saturated or clogged. These filters could be attached to the buoyant rim through various ways. Examples include snapping a filter section onto the buoyant rim. Other examples may include a hook and loop attachment, zipper, buttons, magnetic, slide and pocket, or other attachments.

In certain embodiments, the buoyant rim could include any number of walls and/or skirts to protect from splashing in the buoyant rim, or overflow from spilling over the sides of the rim, before it is filtered.

In some examples, the buoyant rim filtration system could be used in conjunction with the buoyant rim containment system described above. In such a way, certain runoff from the buoyant containment system could be channeled through either separate or integrated buoyant filtration systems. Or filtration along the rim of the containment system could be used as a backup or redundant safety for accidental overflows, splashes, or spillage. For example, the runoff from being pumped from the contained target, could be filtered first through a buoyant filtration system before pumped overboard. Or, the system could include redundant buoyant filtration systems in case of accidental overflow/runoff.

More Example Embodiments

In certain embodiments, the rim is not segmented, but is one continuous rim. In such examples, the entire rim system may have to tip one way or another in order to be moved into position around a target, or to allow the target access to the interior of the area surrounded by the rim. Such example embodiments may also utilize a hanging bag or walls/floor system as described in this disclosure to contain the target and/or material.

Certain example embodiments could include a separate tarp/rim system. In such an example system, a buoyant rim could be draped with a tarp that would act as the integrated rim/bag system described above. Such a separate system could utilize any number of rims or rim segments and a tarp fitted to the application. Further, the tarp could include any number of shapes and be made of any number of materials as described above. In use, such a tarp/rim system could be used in situations where transporting or obtaining a rim system is not easy. In such cases, a tarp for this purpose could more easily be transported. Then, on site, the rim could be assembled and the tarp draped over the rim, and attached to the rim covering the interior void or space encircled by the rim. In such an example embodiment the tarp may be configured to hang below the rim and act as the containment bag as described above.

More Example Uses

Although this disclosure includes discussions of pollutants contained and/or filtered from spreading into bodies of water, the systems and methods could be used in alternate ways as well. Some ways may include the protection of the target or targets inside of the system, instead of protection of the water outside of the system. For instance, the reintroduction of wildlife back into a hazardous environment, may use the system to protect an target such as an animal in the system, from the surrounding waters. Only when acclimated, would the system allow for the animal to swim out into a larger containment system, or an open body of water. In such an example, water from outside of the system could be pumped in, in order to gradually acclimatize the wildlife to the new conditions.

Figure 15:
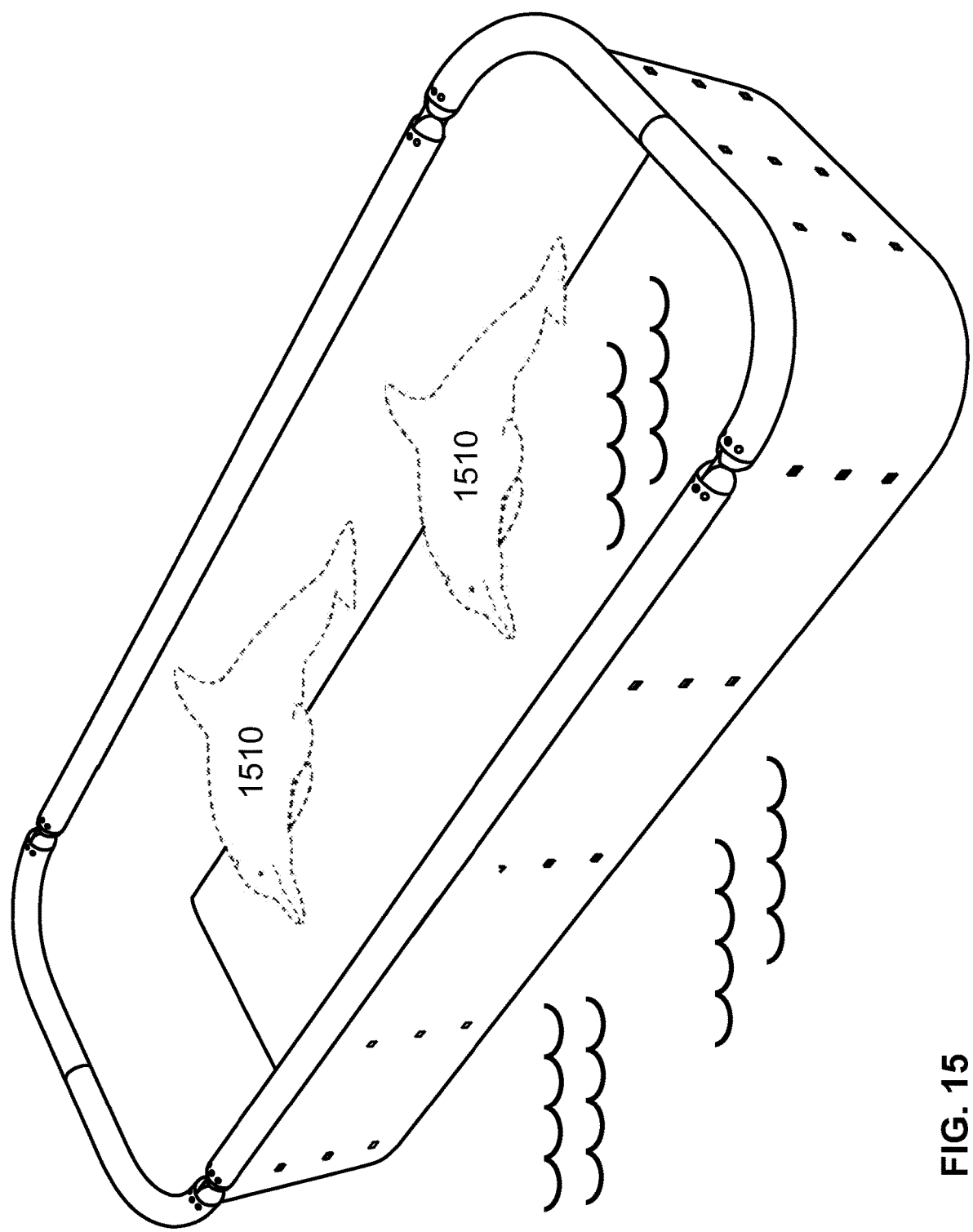
FIG. 15 is an example diagram showing alternate uses consistent with certain embodiments herein.

Thus, in FIG. 15, instead of a ship contained in the system, wildlife 1510 are shown, here dolphins as an example. Any kind of wildlife could be captured using the system, in any sized containment system, from small fish or otters to large dolphins or whales. Injured or sick animals could be contained by surrounding them with the system, such as the one shown in FIG. 1 and shown again in FIG. 15, and then moved to another location, while protected and enveloped in a water environment, as discussed above for other targets. Aquariums could use such a system to quarantine sick animals, or to slowly introduce new animals into an aquarium or other body of water.

The system also allows for people to dive under and around the contained target in order to inspect, repair and maintain it. This can also allow for the safety of such divers, against wildlife, so divers could work in the system and not fear shark attacks, dolphin attacks, or fish disturbance. Such a system would require a sturdy and durable material, such as KEVLAR or similar woven material, to resist such attacks.

The system may be used in a nested method where larger containment systems surround smaller ones. In such a deployment, added protection may be afforded to minimize the risk of spreading a particularly noxious pollutant.

Systems could include the use of materials that are temperature insulated. In this way, the temperature of the contained water could be different from the surrounding water. In a nested deployment, an incremental temperature gradient could keep the innermost containment system toward one extreme, hot or cold, while stepping the gradient either up or down back to the ambient water temperature. Such a temperature change may be useful for particular maintenance of ships, particular welding or underwater construction, or for the safety and comfort of divers working within the system.

CONCLUSION

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more targets, that word covers all of the following interpretations of the word: any of the targets in the list, all of the targets in the list and any combination of the targets in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system, comprising:
    a buoyant rim with a top side and a bottom side, the buoyant rim encircling a void: a submersible bag attached to the buoyant bottom side, where the buoyant rim and the submersible bag are configured to form a container for containing a volume of polluted water, and wherein the buoyant rim and the submersible bag are configured to separate the volume of polluted water from water surrounding an outside of the container;
    a detachable filter on the top side of the buoyant rim; and
    wherein the submersible bag is water permeable and pollutant impermeable.

2. The system of claim 1 wherein the buoyant rim is made of closed cell foam.

3. The system of claim 1 wherein the buoyant rim is made of inflatable plastic.

4. The system of claim 1 wherein the detachable filter portions are attached to the buoyant rim by hook and loop.

5. The system of claim 1 wherein the detachable filter is fibrous.

6. The system of claim 1 wherein the detachable filter is made of a mesh.

7. The system of claim 1 wherein the detachable filter is magnetic.

8. The system of claim 1 wherein the detachable filter is made of plastic.

9. The system of claim 1 wherein the detachable filter is made of metal.

10. The system of claim 1 wherein the detachable filter is flat lying.

11. The system of claim 1 wherein the detachable filter includes upright fins.

12. The system of claim 1 wherein the detachable filter is attached to the buoyant rim by magnets.

13. The system of claim 1 wherein the detachable filter is attached to the buoyant rim by a button.

14. The system of claim 1 wherein the detachable filter is attached to the buoyant rim by a snap.

15. The system of claim 1 wherein the detachable filter is attached to the buoyant rim by a threaded screw.

16. A system, comprising:
    a buoyant rim with a top side and a bottom side, the buoyant rim encircling a void;
    a submersible bag attached to the buoyant bottom side, where the buoyant rim and the submersible bag are configured to form a container for containing a volume of polluted water, and wherein the buoyant rim and the submersible bag are configured to separate the volume of polluted water from water surrounding an outside of the container;
    a spout on the top side of the buoyant rim;
    a detachable filter on a top side of the spout; and
    wherein the submersible bag is water permeable and pollutant impermeable.

* * * * *